United States Patent
Hatton et al.

(10) Patent No.: US 11,446,604 B2
(45) Date of Patent: Sep. 20, 2022

(54) METHODS AND SYSTEMS FOR REMOVING $CO_2$ FROM A FEED GAS

(71) Applicant: Massachusetts Institute of Technology, Cambridge, MA (US)

(72) Inventors: Trevor Alan Hatton, Sudbury, MA (US); Ryan Alex Shaw, Concord, MA (US); Miao Wang, Cambridge, MA (US); Sahag Voskian, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 217 days.

(21) Appl. No.: 16/150,186

(22) Filed: Oct. 2, 2018

(65) Prior Publication Data
US 2019/0099711 A1 Apr. 4, 2019

Related U.S. Application Data
(60) Provisional application No. 62/566,620, filed on Oct. 2, 2017.

(51) Int. Cl.
| | | |
|---|---|---|
| *B01D 53/14* | (2006.01) | |
| *B01D 53/96* | (2006.01) | |
| *B01D 61/42* | (2006.01) | |
| *B01D 53/22* | (2006.01) | |
| *B01D 63/08* | (2006.01) | |
| *B01D 63/02* | (2006.01) | |
| *B01D 71/68* | (2006.01) | |

(Continued)

(52) U.S. Cl.
CPC ......... *B01D 53/1475* (2013.01); *B01D 53/22* (2013.01); *B01D 53/228* (2013.01); *B01D 53/965* (2013.01); *B01D 61/422* (2013.01); *B01D 63/02* (2013.01); *B01D 63/08* (2013.01); *B01D 71/16* (2013.01); *B01D 71/34* (2013.01); *B01D 71/68* (2013.01); *B01D 2053/224* (2013.01); *B01D 2252/2041* (2013.01); *B01D 2257/504* (2013.01)

(58) Field of Classification Search
CPC .. B01D 53/1475; B01D 53/22; B01D 53/228; B01D 53/965; B01D 61/422; B01D 71/64; B01D 2053/224; B01D 2252/2041; B01D 2257/504; B01D 63/02; B01D 63/08; B01D 71/16; B01D 71/34; B01D 71/68
USPC ......................................... 423/228
See application file for complete search history.

(56) References Cited

U.S. PATENT DOCUMENTS

| | | |
|---|---|---|
| 9,302,219 B2 | 4/2016 | Stern et al. |
| 9,567,678 B2 | 2/2017 | Eltayeb et al. |

(Continued)

FOREIGN PATENT DOCUMENTS

WO WO-2017100867 A1 * 6/2017 ............. B01D 53/78

OTHER PUBLICATIONS

International Search Report and Written Opinion dated Dec. 20, 2018 for Application No. PCT/US2018/053911.

(Continued)

*Primary Examiner* — Anita Nassiri-Motlagh
(74) *Attorney, Agent, or Firm* — Wolf, Greenfield & Sacks, P.C.

(57) ABSTRACT

Systems and methods for at least partially removing carbon dioxide ($CO_2$) from a feed gas comprising $CO_2$ are generally provided.

16 Claims, 9 Drawing Sheets

(51) Int. Cl.
    *B01D 71/16*    (2006.01)
    *B01D 71/34*    (2006.01)

(56) References Cited

U.S. PATENT DOCUMENTS

| | | | |
|---|---|---|---|
| 2008/0202341 | A1 | 8/2008 | Poole et al. |
| 2012/0247327 | A1* | 10/2012 | Omole ............... B01D 53/1425 95/51 |
| 2016/0114290 | A1 | 4/2016 | Stern et al. |
| 2017/0001142 | A1* | 1/2017 | Rayner ................. B01D 53/62 |
| 2017/0209846 | A1 | 7/2017 | Eltayeb et al. |
| 2017/0274318 | A1 | 9/2017 | Constantz et al. |

OTHER PUBLICATIONS

Eltayeb et al., Energetics of electrochemically-mediated amine regeneration. Energy Procedia. 2014;63:595-604.
Stern et al., Post-combustion carbon dioxide capture using electrochemically mediated amine regeneration. Energy Environ Sci. 2013;6:2505-17. Epub Jun. 6, 2013.
[No Author Listed], America's Climate Choices. National Research Council. 2011. doi:10.17226/12781. 134 pages.
[No Author Listed], International Energy Agency. Energy Technology Perspectives 2010: Scenarios and Strategies to 2050. 2010. 709 pages.
[No Author Listed], How much carbon dioxide is produced per kilowatthour of U.S. electricity generation? FAQ—U.S. Energy Information Administration (EIA). 2016. https://www.eia.gov/tools/faqs/faq.cfm?id=74&t=11 [accessed online Apr. 9, 2019], 2 pages.
Boot-Handford et al., Carbon capture and storage update. Energy Env Sci. 2014;7:130-189. doi:10.1039/C3EE42350F. Epub Sep. 13, 2013.
Gurkan et al., Quinone Reduction in Ionic Liquids for Electrochemical $CO_2$ Separation. ACS Sustainable Chem Eng. May 2015;3:1394-1405.
Lin et al., Pilot plant test of the advanced flash stripper for $CO_2$ capture. Faraday Discuss. Oct. 20, 2016;192:37-58. Epub Mar. 18, 2016.
Marcott et al., A Reconstruction of Regional and Global Temperature for the Past 11,300 Years. Science. Mar. 8, 2013;339(6124):1198-1201.
Metz et al., Climate Change 2007—Mitigation of Climate Change. Contribution of Working Group III to the Fourth Assessment Report of the Intergovernmental Panel on Climate Change. Cambridge University Press. 2007. 863 pages.
Oreskes, The Scientific Consensus on Climate Change. Science. Dec. 3, 2004;306:1686.
Rheinhardt et al., Electrochemical Capture and Release of Carbon Dioxide. ACS Energy Lett. 2017;2:454-461.
Rochelle, Amine Scrubbing for $CO_2$ Capture. Science. Sep. 25, 2009;325(5948):1652-4.
Solomon et al., Irreversible climate change due to carbon dioxide emissions. Proc Natl Acad Sci. Feb. 10, 2009;106(6):1704-1709.
Stern et al., Bench-scale demonstration of $CO_2$ capture with electrochemically-mediated amine regeneration. RSC Adv. 2014;4(12):5906-14. Epub Nov. 29, 2013.
Stern, Electrochemically-mediated amine regeneration for carbon dioxide separations. MIT Thesis. Doctor of Philosophy in Chemical Engineering. Feb. 2014:204 pages. Available to the public May 23, 2014.
Wang et al., Energetics of electrochemically mediated amine regeneration process for flue gas CO2 capture. Int J Greenhouse Gas Control. Mar. 2019;82:48-58.

* cited by examiner

METHODS AND SYSTEMS FOR REMOVING $CO_2$ FROM A FEED GAS

CROSS-REFERENCE TO RELATED APPLICATIONS

This application claims the benefit of priority under 35 U.S.C. § 119(e) of U.S. provisional application Ser. No. 62/566,620, filed Oct. 2, 2017, the disclosure of which is incorporated by reference here in its entirety.

TECHNICAL FIELD

Systems and methods for at least partially removing carbon dioxide ($CO_2$) from a feed gas comprising $CO_2$ are generally provided.

BACKGROUND

Anthropogenic $CO_2$ emissions have resulted in a 40% increase in atmospheric $CO_2$ concentration since the industrial revolution, half of which has come in the last 50 years. $CO_2$, a greenhouse gas, absorbs infrared radiation reflected from the Earth's surface, which would otherwise be sent to space. As such, there is a strong agreement within the scientific community that greenhouse gas emissions are causing climate change. Removing $CO_2$ from emission streams, including exhaust gas produced by power plants, cement production, and/or aluminum production, would greatly decrease the amount of $CO_2$ in the Earth's atmosphere. Thermal amine scrubbing exhibits excellent removal efficiencies and product high purity $CO_2$ outlet streams, but the significant amount of steam produced and the capital expenses are an impediment to its implementation on a large sale. Accordingly, improved systems and/or methods of $CO_2$ removal are needed.

SUMMARY

Systems and methods for at least partially removing $CO_2$ from a feed gas comprising $CO_2$ are provided. The subject matter involves, in some cases, interrelated products, alternative solutions to a particular problem, and/or a plurality of different uses of one or more systems and/or articles.

In one set of embodiments, systems for at least partially removing $CO_2$ from a feed gas comprising $CO_2$ are provided. In one embodiment, a system is described, wherein the system comprises an anode, a cathode, a solution, a membrane separator, at least one gas input associated with the cathode and/or cathodic chamber, at least one gas outlet for removing uncaptured gas from the system, and at least one gas outlet for removing $CO_2$ from the system. In another embodiment, the anode is at least partially contained within an anodic chamber, and the cathode is at least partially contained within the cathodic chamber. The anodic chamber and the cathodic chamber are in fluid connection with each other, and the cathode comprises at least one cathodic channel capable of allowing the flow of $CO_2$ through the at least one channel. The membrane separator is at least partially disposed between the anodic chamber and the cathodic chamber. In a further embodiment, the solution comprises a complexation agent, metal ions, and a supporting electrolyte, wherein the complexation agent is capable of associating and/or disassociating with $CO_2$ and/or the metal ions.

In another set of embodiments, methods are provided. In one embodiment, a method of at least partially removing $CO_2$ from a feed gas comprising $CO_2$ is provided. The method comprises applying an electrical potential to the anode and the cathode in an embodiment of the system described above, flowing the feed gas through an embodiment of the system described above, and removing at least a portion of the $CO_2$ from the feed gas.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

Figure 1:
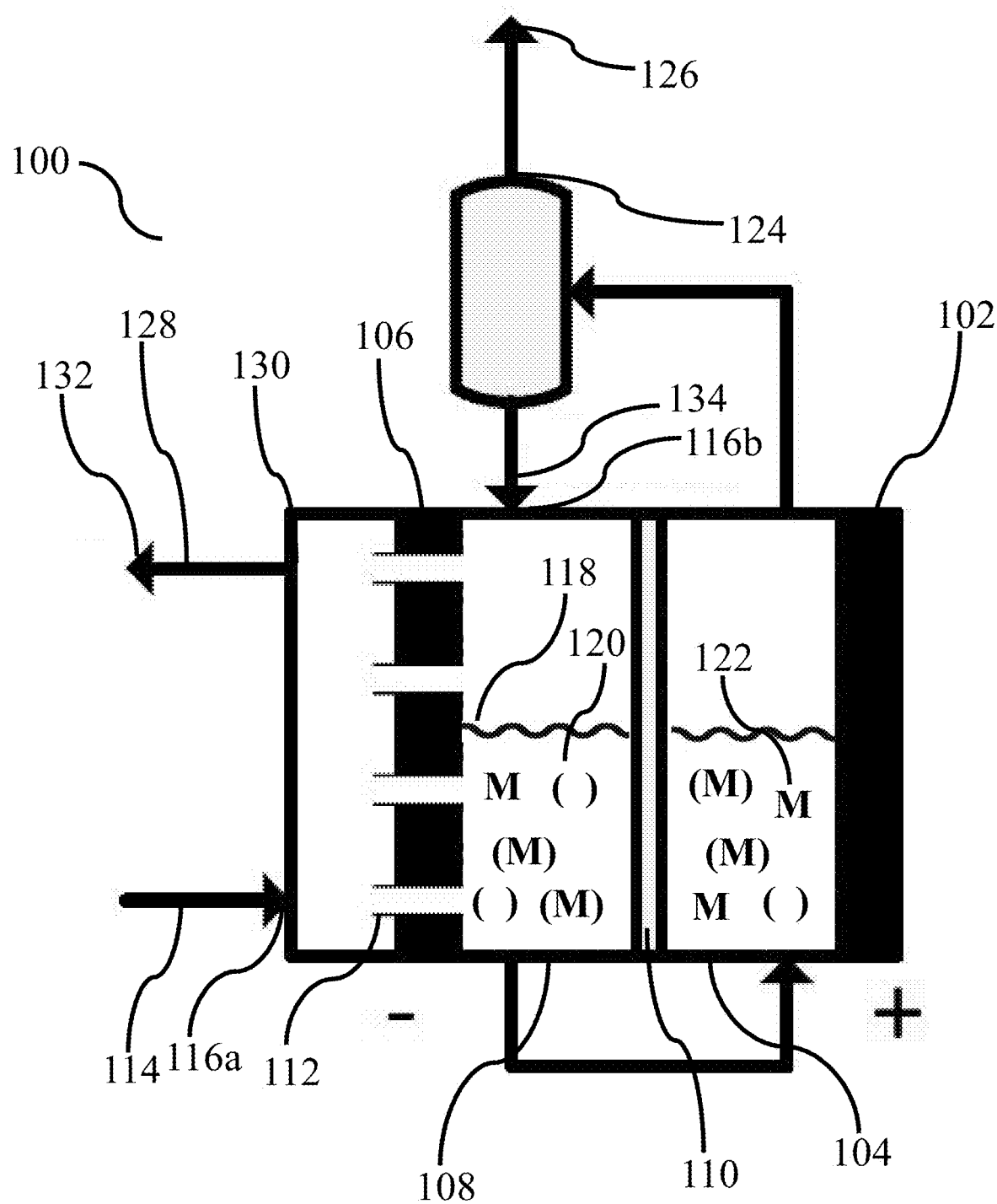
FIG. 1 depicts a non-limiting schematic of a system for at least partially removing $CO_2$ from a feed gas comprising $CO_2$.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Systems and methods related to at least partially removing $CO_2$ from a feed gas stream comprising $CO_2$ are provided. According to some of the methods described herein, at least partial removal of $CO_2$ from a feed gas may comprise the step of electrochemically reducing and/or oxidizing a complexation agent and/or metal ions. In certain embodiments, the complexation agent associates with $CO_2$ and/or metal ions upon exposure to an electrical potential, and the complexation agent disassociates from $CO_2$ and/or metal ions upon exposure to a second electrical potential.

In some embodiments, a system comprises an anode, a cathode, an anodic chamber, a cathodic chamber, a membrane separator at least partially disposed between the anodic chamber and the cathodic chamber, and at least one cathodic channel within the cathodic chamber and/or cathode. In certain embodiments, the system comprising the components described above may be an electrochemical cell. According to some embodiments, an electrical potential is applied to the system (e.g., the electrochemical cell). In certain embodiments, the cathode is a cathode absorber, which is described in detail herein. The cathode and/or cathodic chamber, according to some embodiments, is associated with and/or connected to at least one gas input. The cathode and/or cathodic chamber may allow for the flow of feed gas comprising $CO_2$ through the at least one cathodic channel. In certain embodiments, the $CO_2$ permeates through the at least one cathodic channel.

According to some embodiments, the system further comprises a solution comprising complexation agent, metal ions, and electrolyte. In some aspects, the solution may flow through the cathodic chamber, and come into contact with $CO_2$ derived from the feed gas comprising $CO_2$ that has permeated through the at least one cathodic channel. In some further embodiments, the complexation agent may be dissolved in solution and is capable of associating and/or disassociating with $CO_2$ and/or metal ions in solution upon exposure to an electrical potential from the anode and/or the cathode.

In certain aspects, the system may further comprise at least one gas outlet for removing uncaptured gas, and at least one gas outlet for removing $CO_2$, as will be described further herein.

Some embodiments refer to a method of at least partially removing $CO_2$ from a feed gas, the method comprising applying an electrical potential to the anode and cathode in a system (e.g., an electrochemical cell) and flowing the feed gas through the system. As stated above, upon application of an electrical potential to the system, a complexation agent may associate and/or disassociate with $CO_2$ and/or metal ions. For example, the feed gas comprising $CO_2$ may flow through the system and come into contact with a solution comprising complexation agent, metal ions, and electrolyte in the cathodic chamber, where $CO_2$ is absorbed. In certain embodiments, the complexation agent associates with $CO_2$ to form a soluble-$CO_2$ species in the cathodic chamber. In some aspects, the soluble-$CO_2$ species (e.g., in solution) passes from the cathodic chamber to an anodic chamber through the membrane separator. According to certain embodiments, upon exposure to an electrical potential at the anode, metal ions in an oxidized form can preferentially bind the complexation agent (e.g., from the soluble-$CO_2$ species), which disassociates the $CO_2$ (e.g., desorbed at the anode), thereby forming a metal coordination complex (e.g., a complexation agent bound to at least one metal ion). The $CO_2$ release from the soluble-$CO_2$ species may be collected from the anodic chamber. In certain embodiments, the metal coordination complex (e.g., in solution) passes from the anodic chamber through the membrane separator back to the cathodic chamber. The metal center of the metal coordination complex is reduced, according to some embodiments, upon exposure to an electrical potential at the cathode. Upon reduction of the metal center, the complexation agent disassociates from the metal center, generating free complexation agent in solution that can again associate with $CO_2$ in the cathodic absorber. According to certain embodiments, the method of $CO_2$ removal can be cyclically repeated or continuous.

Additional details regarding the systems are now provided. A first non-limiting example of a system for at least partial removal of $CO_2$ from a feed gas stream is shown in FIG. 1. According to some embodiments, system 100 for at least partial removal of $CO_2$ comprises anode 102 and cathode 106. System 100 may be an electrochemical cell. As illustrated in FIG. 1, system 100 comprises anode 102 at least partially contained within anodic chamber 104, and cathode 106 at least partially contained within cathodic chamber 108. According to some embodiments, anode 102 may be entirely contained with anodic chamber 104. In some other embodiments, cathode 106 may be entirely contained with cathodic chamber 108.

According to some embodiments, anodic chamber 104 and cathodic chamber 108 are in fluid communication with each other via at least membrane separator 110 and/or solution 118. According to certain embodiments, membrane separator 110 is at least partially disposed between anodic chamber 104 and cathodic chamber 108. In some other embodiments, membrane separator 110 is completely disposed between anodic chamber 104 and cathodic chamber 108. According to certain embodiments, membrane separator 110 may be permeable. The term fluid communication, as used herein, is given its ordinary meaning in the art and generally refers to two components or regions containing a fluid, where the components or regions are connected together (e.g., by direct contact, or via a permeable membrane, etc.) so that a fluid can flow between the two components or regions. For example, in some embodiments, membrane separator 110 is capable of allowing the flow of a solution between anodic chamber 104 and cathodic chamber 108.

According to certain embodiments, the cathodic chamber comprises a plurality of cathodic channels 112. Feed gas 114 may be provided to at least one cathodic channel via feed gas input 116a. In some embodiments, feed gas 114 may pass through at least one cathodic channel 112 into cathodic chamber 108 and solution 118, thereby increasing the concentration of $CO_2$ in solution 118 in cathodic chamber 108. Feed gas 114 comprising $CO_2$ may also comprise other gases (e.g., inert gases such as $N_2$) and/or components, as described in more detail herein. In some embodiments, cathodic channel 112 comprises a plurality of hollow fiber membranes (e.g., see FIG. 2, described herein) for which the feed gas comprising $CO_2$ flows through. According to certain embodiments, the plurality of hollow fiber membranes allowing for the flow of $CO_2$ are permeable. In certain embodiments, the $CO_2$ gas permeates through the at least one cathodic channel 112 (e.g., through a plurality of hollow fiber membranes).

In some cases, cathodic chamber 108 generally comprises solution 118 comprising complexation agent 120, metal ions 122, and electrolyte (not shown) that is capable of flowing between anodic chamber 104 and cathodic chamber 108. In certain embodiments, the solution is capable of flowing between anodic chamber 104 and cathodic chamber 108 through membrane separator 110. According to certain embodiments, as solution 118 flows through cathodic chamber 108, at least a portion of the solution will come into contact with the $CO_2$ that has permeated through the at least one cathodic channel 112 (e.g., through a plurality of hollow fiber membranes) comprised in the cathodic chamber 108, thereby increasing the concentration of $CO_2$ in the solution. In certain embodiments, cathode 106 in system 100 is a cathodic absorber.

In some embodiments, system 100 also comprises at least one gas outlet. For example, gas outlet 124 may allow for removal of $CO_2$ 126 formed from the anodic chamber from system 100. At least a portion of the gas may be return to the cathodic chamber, in some embodiments. For example, gas 134 may be reintroduced to the system via input 116b. In certain embodiments, cathodic chamber 108 further comprises at least one gas outlet 130 which allows for the flow of uncaptured gas 132 from system 100. Uncaptured gas 132 may be reintroduced to the system via input 116a or another inlet.

A non-limiting example of a method of at least partial removal of $CO_2$ from a feed gas stream can be described in further reference to FIG. 1. In some certain embodiments, complexation agent 120 is capable of associating and/or disassociating with $CO_2$ and/or metal ions 122. According to certain embodiments, complexation agent 120 may associate and or disassociate with $CO_2$ and/or metal ions 122 via any or a variety of suitable ways. For example, complexation agent 120 (e.g., an amine) may associate with $CO_2$ via forming one or more chemical bonds (e.g., covalent bonds), thereby forming a complexation agent-$CO_2$ species (e.g., a carbamate). In certain further embodiments, complexation agent 120 (e.g., ethylenediamine) may associate with a metal ion 122 via forming one or more chemical bonds (e.g., covalent bonds or metal coordination chemistry), thereby forming a metal coordination complex (e.g., Cu(II)-ethylenediamine).

In some cases, complexation agent 120 is capable of associating $CO_2$ upon exposure to an electrical potential (e.g., from cathode 106) and is capable of disassociating $CO_2$ upon exposure to a different electrical potential (e.g., from anode 102). In some embodiments, complexation agent 120 is capable of associating metal ions 122 upon exposure to an electrical potential (e.g., from anode 102) and is capable of disassociating metal ions 122 upon exposure to a different electrical potential (e.g., from cathode 106). For example, complexation agent 120 (e.g., ethylenediamine) in solution 118, may associate with $CO_2$ (e.g., to make a carbamate) as solution 118 comes into contact with the $CO_2$ that has permeated through the at least one cathodic channel in cathodic chamber 108, thereby forming a soluble-$CO_2$ species. The soluble-$CO_2$ species may pass from cathodic chamber 108 to anodic chamber 104 via membrane separator 110. In anodic chamber 104, the soluble-$CO_2$ species, upon exposure to an different electrical potential from anode 102, may release $CO_2$ to preferentially associate with metal ion 122 (e.g., Cu(II)), forming a metal coordination complex (e.g., Cu(II)-ethylenediamine). The metal coordination complex may pass from anodic chamber 104 to cathodic chamber 108 via membrane separator 110. In cathodic chamber 108, the metal ion of the metal coordination complex, upon exposure to an electrical potential from cathode 106, may be oxidized (e.g., forming metal atoms), resulting in free complexation agent. In certain embodiments, the above-described cycle may be repeated.

According to certain embodiments, metal ions 122 may be present in solution via release from an electrode (e.g., anode 102 and/or cathode 106). For example, upon exposure to an electrical potential, anode 102 (e.g., Cu metal) may oxidize and release metal ion 122 (e.g., Cu(II)) into solution 118. In some embodiments, metal ions 122 may be removed from solution via association with an electrode. For example, upon exposure to an electrical potential, cathode 106 (e.g., Cu metal) may reduce metal atoms in solution 118, or the metal atoms may associate with cathode 106.

Figure 3:
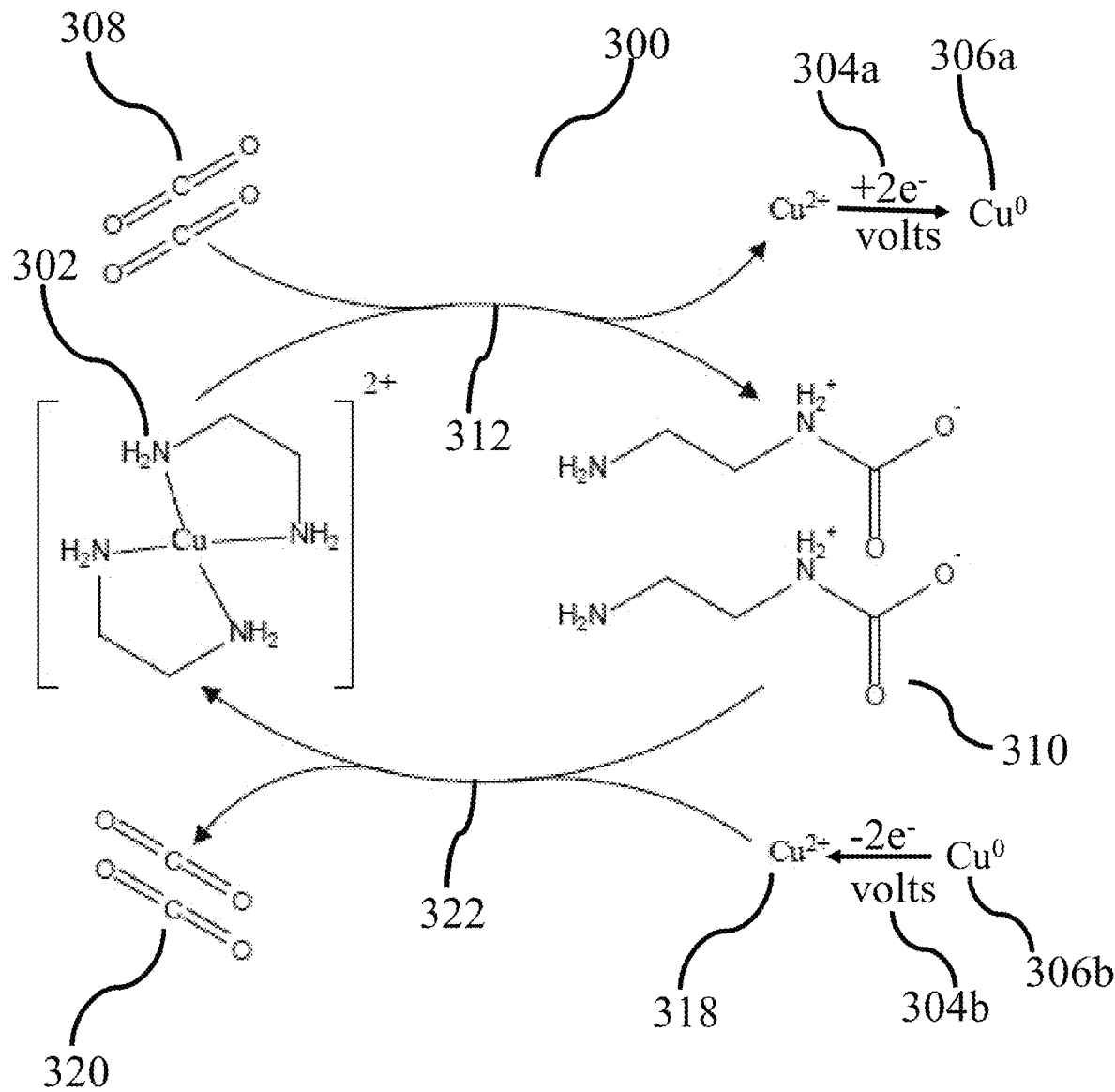
FIG. 3 shows a reactivity cycle of complexation agent associating and/or disassociating $CO_2$ and/or metal ions, according to some embodiments.

A non-limiting example of the reactivity cycle relating to the systems and methods described herein is shown in FIG. 3. In certain embodiments, reactivity cycle 300 takes place within a system as described herein. In certain embodiments, the solution contained in the system comprises a complexation agent, metal ions, and electrolyte. In a non-limiting example, the complexation agent is ethylenediamine and the metal ions are Cu(II) ions. According to some embodiments, Cu(II)-ethylenediamine complex 302 is in the solution. In some cases, upon exposure to applied electrical potential 304a, Cu(II)-ethylenediamine complex 302 is reduced to form Cu metal 306a and ethylenediamine (not shown) at the cathode. In some embodiments, the application of electrical potential 304a may be continuous. In some aspects, Cu metal 306a reduced from Cu(II) in Cu(II)-ethylenediamine complex 302 may associate with or form on the cathode. In certain embodiments, upon reduction of Cu(II)-ethylenediamine complex 302, $CO_2$ 308 from incoming feed gas comprising $CO_2$ is absorbed by ethylenediamine generating carbamate 310. According to some embodiments, the reactivity taking place at the cathode is cathodic absorption process 312 as $CO_2$ 308 is absorbed by ethylenediamine in the cathode upon reduction of Cu(II)-ethylenediamine 302 to Cu metal 306a by applied electrical potential 304a. As the solution flows from the cathode in fluid communication with the anode (as described above) applied electrical potential 304b (e.g., continuously applied electrical potential) may oxidize Cu metal electrode 306b to Cu(II) ions 318. Upon oxidation of the Cu metal 306b (e.g., Cu metal electrode) to Cu(II) ions 318, Cu(II) may preferentially bind to ethylenediamine 310 to generate Cu(II)-ethylenediamine complex 302, thereby resulting the release of $CO_2$ 320 from carbamate 310. In some embodiments, the reactivity taking place at the anode is an anodic desorption process 322, as $CO_2$ 320 is desorbed from carbamate 310 upon oxidation of Cu metal electrode 306b to Cu(II) ions 318. In certain embodiments, the reactivity displayed in FIG. 3 is cyclic.

Figure 2:
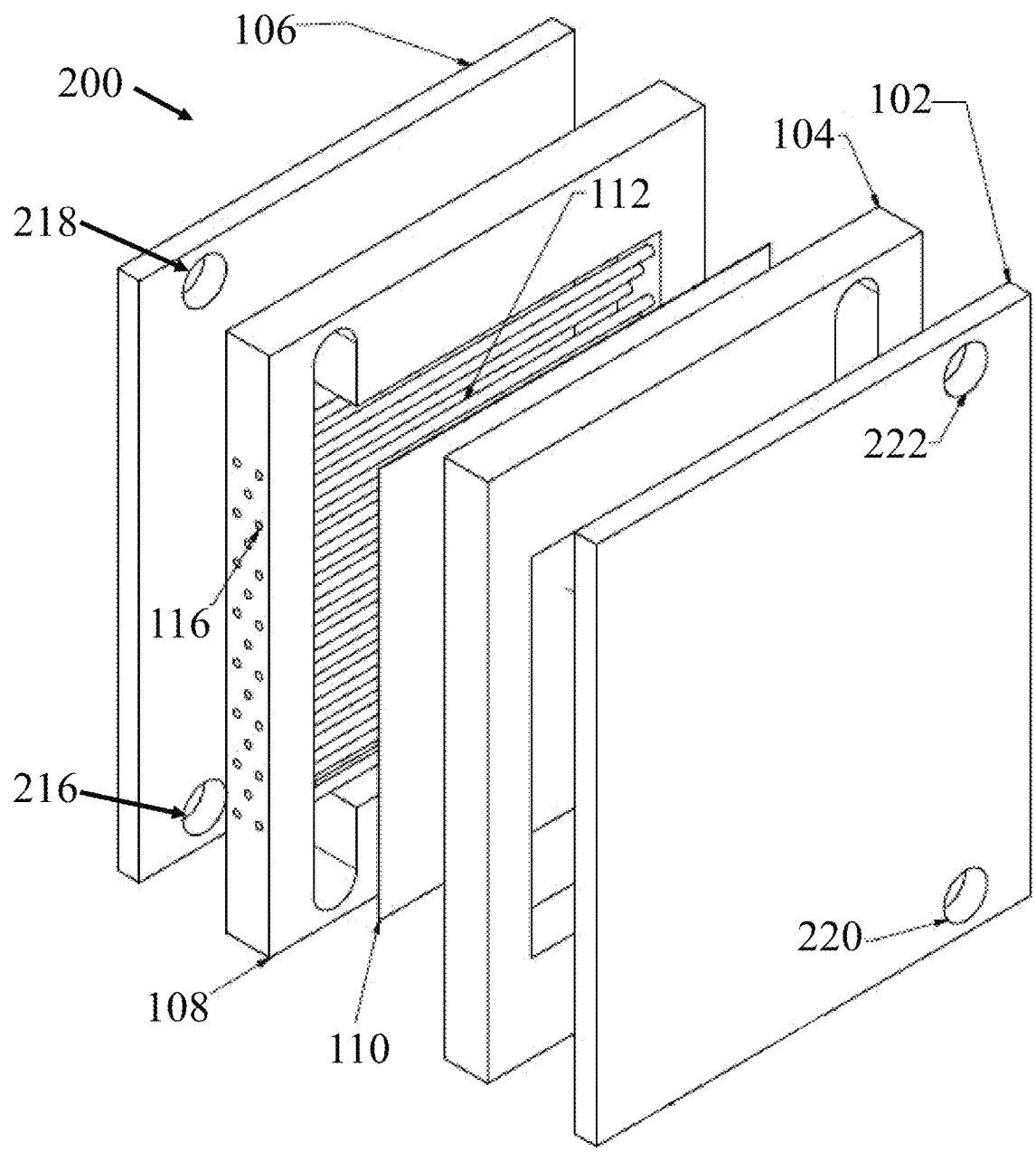
FIG. 2 shows a schematic of the separate components of a system for at least partially removing $CO_2$ from a feed gas comprising $CO_2$, according to some embodiments.

Another non-limiting example of the system for at least partially removing $CO_2$ from a feed gas stream is also shown in FIG. 2. According to some embodiments, system 200 comprises cathode 106 and anode 102. As shown in FIG. 2, cathode 106 is associated with cathodic chamber 108 and anode 102 is associated with anodic chamber 104. According to some embodiments, membrane separator 110 is disposed between cathode 106 and anode 102. As described herein, membrane separator 110 allows for fluid communication between cathode 106 and anode 102. In some cases, a solution can be disposed within system 200 to flow between cathode 106 and anode 102. According to some embodiments, the solution comprises a complexation agent, metal ions, and an electrolyte. In certain embodiments, the solution flows in through cathodic flow in 216 and/or anodic flow in 220. According to some embodiments, the solution can flow out through cathodic flow out 218 and/or anodic flow out 222. According to some embodiments, comprised within cathodic chamber 108 are a plurality of cathodic channels 112 (e.g., hollow fiber membranes), which allow for the flow of $CO_2$ gas from feed gas input 116. In some embodiments, a plurality of cathodic channels 112 are permeable and allow for the permeation of $CO_2$ as feed gas comprising $CO_2$ flows through feed gas input 116. As described herein, as solution comprising complexation agent, metal ions, and electrolyte flows through cathodic flow in 216 and/or anodic flow in 220, the solution may come into contact with $CO_2$ that has permeated through a plurality of cathodic channels 112. According to certain embodiments, the cathode is a cathode absorber as $CO_2$ is absorbed by the solution comprising complexation agent, metal ions, and electrolyte. According to certain embodiments, as the solution comes into contact with $CO_2$ that has permeated through a plurality of cathodic channels 112, a complexation agent (e.g., an amine) may associate with $CO_2$ to generate a complexation agent-$CO_2$ species (e.g., a carbamate). As described above in the various embodiments of FIG. 1, the method of removal of $CO_2$ from system 200 can similarly occur.

According to certain embodiments, the energy efficiency of removal of $CO_2$ from a feed gas can be calculated by means and/or methods known to those skilled in the art. In some embodiments, the energy efficiency of removal (of $CO_2$) generally refers to work of capture per mole of $CO_2$ (e.g., activation overpotential). In some embodiments, the total work of an electrochemical cell is determined by the path integral of the open circuit potential in the electrochemical cell with respect to the state of charge. In certain embodiments, the energy efficiency of removal of $CO_2$ is calculated as the sum of the electrochemical work of capture of $CO_2$, the work of compression of $CO_2$ to 150 bar for storage, and the work of pumping solution through the system.

In certain embodiments, the energy efficiency of removal of $CO_2$ from a feed gas is about 10 kJ/mol, about 15 kJ/mol, about 18 kJ/mol, about 20 kJ/mol, about 22 kJ/mol, about 25 kJ/mol, or about 30 kJ/mol. In certain embodiments, the energy efficiency of removal of $CO_2$ from a feed gas is between about 10 kJ/mol and about 30 kJ/mol, between about 15 kJ/mol and about 25 kJ/mol, or between about 18 kJ/mol and about 22 kJ/mol. According to certain embodiments, the energy efficiency of removal of $CO_2$ reduction in the feed gas is about 20 kJ/mol or less.

According the certain embodiments, the percentage of $CO_2$ removed from the feed gas is any of a variety suitable amounts. The feed gas comprising $CO_2$ comprises any of a variety of suitable amounts of $CO_2$ gas. For example, in certain embodiments, the feed gas comprising $CO_2$ comprises 15% $CO_2$ by volume. In some embodiments, the percentage of $CO_2$ removed from the feed gas is determined by comparing the amount of $CO_2$ removed (e.g., collected via gas outlet) to the amount of $CO_2$ present in the original feed gas. The amount of $CO_2$ gas in a gas stream may be determined using methods and systems know to those of ordinary skill in the art. For example, methods of detection of $CO_2$ include gas chromatography-mass spectrometry or infrared spectroscopy. In some embodiments, the percentage of $CO_2$ removed from the feed gas is at least about 30%, at least about 40%, at least about 50%, at least about 60%, at least about 70%, at least about 80%, at least about 85%, at least about 90%, at least about 95%, or at least about 99% as compared to the original amount of $CO_2$ in the feed gas. According to certain embodiments, the amount of $CO_2$ reduced in a feed gas is between about 30% and about 70%, between about 50% and about 80%, or between about 60% and about 90%.

In some cases, the partial pressure of $CO_2$ at the cathode and/or in the cathodic chamber can be determined using methods and systems known to those of ordinary skill in the art. For example, calculations using Dalton's Law and/or the vapor pressure of $CO_2$ may be used to determine the partial pressure of $CO_2$ at the cathode and/or in the cathodic chamber. As used herein, the term partial pressure is given its ordinary meaning in the art and generally refers to the pressure of a single gas in a mixture of gases if it alone occupied the entire volume of the mixture of gases at the same temperature. According to some embodiments, the partial pressure of $CO_2$ can have any of a variety of suitable values. In certain embodiments, the partial pressure of $CO_2$ at the cathode is constant. In some embodiments, the partial pressure of $CO_2$ at the cathode is different than the partial pressure of $CO_2$ at the anode. In some embodiments, the partial pressure of $CO_2$ at the cathode and/or in the cathodic chamber may be about 0.02 bar, about 0.05 bar, about 0.08 bar, about 0.10 bar, about 0.12 bar, about 0.15 bar, about 0.18 bar, or about 0.2 bar. According to some embodiments, the partial pressure of $CO_2$ at the cathode and/or cathodic chamber may be between 0.05 bar and 0.18 bar, between 0.10 bar and 0.15 bar, or between 0.12 bar and 0.15 bar. In some cases, the $CO_2$ has any of a variety of suitable partial pressures at the anode. In some embodiments, the partial pressure of $CO_2$ at the anode and/or anodic chamber may be about 1 bar, about 2 bar, about 5 bar, about 10 bar, about 12 bar, or about 15 bar. According to some embodiments, the partial pressure of $CO_2$ at the anode and/or anodic chamber may be between 1 bar and 15 bar, between 2 bar and 12 bar, or between 5 bar and 10 bar. According to certain embodiments, the partial pressure of $CO_2$ at the anode and/or anodic chamber may be greater than the partial pressure of $CO_2$ at the cathode and/or cathodic chamber. In some embodiments, the partial pressure of $CO_2$ at the anode is about 50% greater than the partial pressure of $CO_2$ at the anode.

The cathode and/or anode may be any of a variety of suitable electrodes. According to some embodiments, the cathode is monolithic. In certain embodiments, the cathode comprises a metal (e.g., copper). Additional details regarding the anode and/or cathode materials are described herein.

Figure 4:
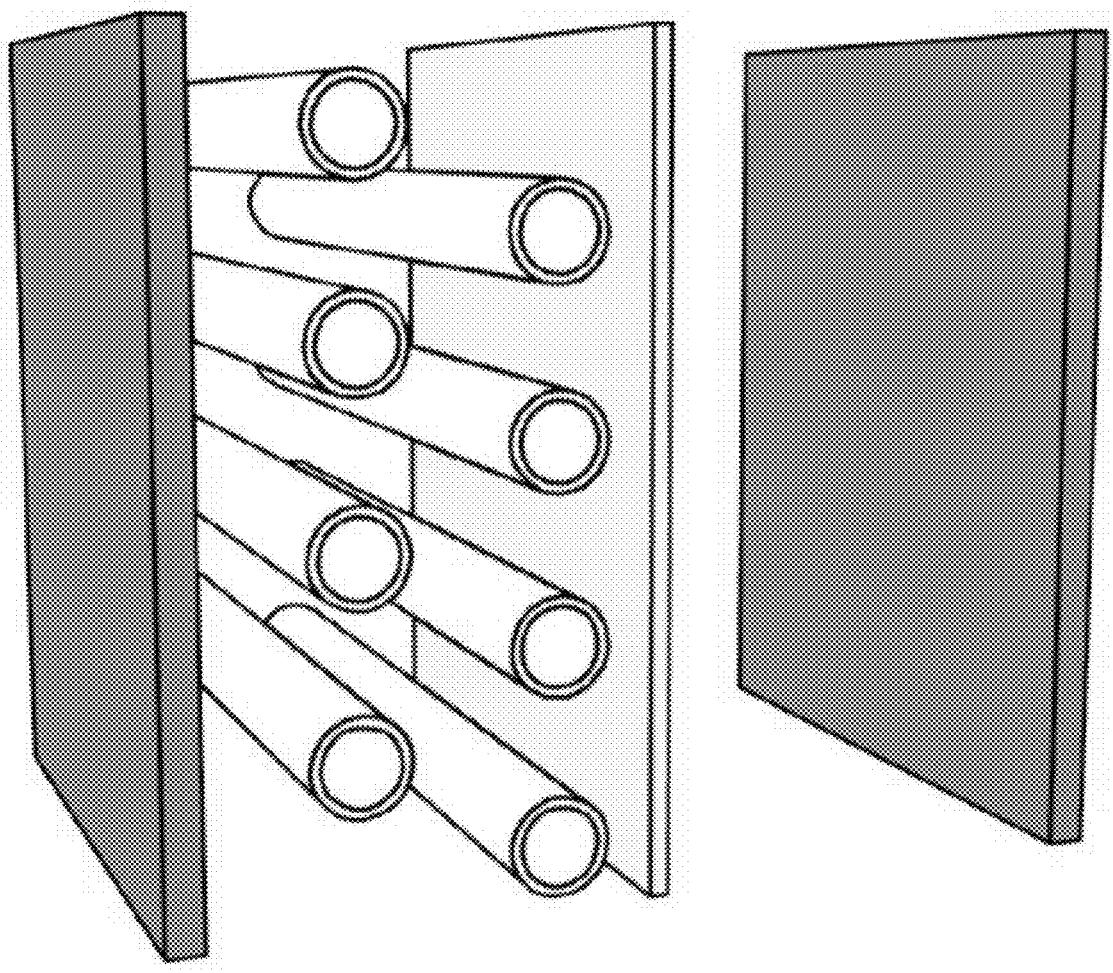
FIG. 4 shows a schematic of the plurality of hollow fiber membranes in the at least one cathodic channel of a system, according to some embodiments.

As previously described, according to some embodiments, the cathode is at least partially contained within a cathodic chamber. In some further embodiments, the cathode is entirely contained within a cathodic chamber. In some embodiments, the cathodic chamber may in fluid communication with the anodic chamber. In some aspects, the cathodic chamber is in fluid communication with the anodic chamber via a membrane separator at least partially disposed between the anodic chamber and the cathodic chamber. In certain embodiments, the cathodic chamber comprises at least one cathodic channel that further comprises a plurality of hollow fiber membranes, as shown in FIG. 4, that are capable of allowing the flow of $CO_2$ through the at least one cathodic channel.

In some cases, the cathode is a cathode absorber. That is, $CO_2$ gas to be removed from a feed gas is absorbed at the cathode and/or cathodic chamber. For example, a feed gas comprising $CO_2$ is provided through the at least one cathodic channel comprises in the cathodic chamber. According to certain embodiments, the feed gas comprising $CO_2$ may pass through the plurality of cathodic channels comprised within the cathodic chamber. As $CO_2$ passes through the plurality of cathodic channels, it may permeate through the plurality of cathodic channels and be absorbed by a solution comprising a complexation agent, generating a soluble $CO_2$ species, as described herein.

As would be understood by those skilled in the art, reduction takes place at the cathode upon application of an electrical potential to the system. In certain cases, the cathode comprises a metal (e.g., Cu metal), that may be a product from the reduction of Cu(II) ions in solution. For example, a Cu(II) metal center of a coordination-complex (e.g., Cu(II)-ethylenediamine) may be reduced upon application of an electrical potential to the system, generating elemental metal (e.g., Cu metal) and complexation agent (e.g., ethylenediamine). In some aspects, the cathode reduces metal ions to elemental metal. In some embodiments, the complexation agent disassociated from the metal ions upon reduction of the metal ions to elemental metal. In certain aspects, the cathode comprises the metal ions, wherein at least about 10%, at least about 20%, at least about 30%, at least about 40%, at least about 50%, at least about 60%, at least about 70%, at least about 80%, at least about 90%, at least about 95%, at least about 98%, at least about 99%, or more, of the cathode by weight are the metal ions.

According to some embodiments, the anode is monolithic. In some embodiments, the anode comprises a metal (e.g., Cu metal). As would be understood by those skilled in the art, oxidation takes place at the anode upon application of an electrical potential to the system. In certain cases, the anode comprises a metal (e.g., Cu metal) that is oxidized (e.g. Cu(II)). In some cases, the anode comprises the metal ions, wherein at least about 10%, at least about 20%, at least about 30%, at least about 40%, at least about 50%, at least about 60%, at least about 70%, at least about 80%, at least about 90%, at least about 95%, at least about 98%, at least about 99%, or more, of the anode by weight are the metal ions.

In some cases, the anode is an anode desorber. That is, desorption of $CO_2$ occurs at the anode and/or within the anodic chamber. In some cases, desorption of $CO_2$ occurs at the anode upon application of an electrical potential to the anode. For example, an anode comprising metal (e.g., Cu metal) can be oxidized upon application of an electrical potential to the system, generating metal ions (e.g., Cu(II)). In some cases, the anode oxidizes elemental metal (e.g., a Cu anode). Upon generation of metal ions, the metal ions can preferential bind ethylenediamine, which has disassociated $CO_2$. According to certain embodiments, the $CO_2$ is desorbed at the anode upon application of an electrical potential to the system.

In some embodiments, the cathode described herein is at least partially contained within a cathodic chamber. In some cases, the cathode is at least about 50% by area contained within a cathodic chamber, at least about 60% by area contained within a cathodic chamber, at least about 70% by area contained within a cathodic chamber, at least about 80% by area contained within a cathodic chamber, at least about 90% by area contained within a cathodic chamber, at least about 95% by area contained within a cathodic chamber, at least about 99% by area contained within a cathodic chamber, or about 100% by area contained within a cathodic chamber. According to some embodiments, the cathode is entirely contained with a cathodic chamber.

According to certain embodiments, the cathodic chamber comprises at least one cathodic channel. As described herein, the cathodic channel allows for the flow of feed gas comprising $CO_2$ from at least one gas input associated with the cathode and/or cathodic chamber. Generally, the cathodic channel is permeable to $CO_2$. The systems or methods described herein may comprises a single cathodic channel or a plurality of cathodic channels (e.g., 2, 5, 10, 20, 30, 40, 50, 60, 70, 80, 90, 100, or more, cathodic channels). The channels may be dispersed through the chamber in any of a variety of suitable arrangements. For example, a plurality of cathodic channels may be grouped together. In some cases, the cathodic channel provides a constant $CO_2$ partial pressure path. For example, the partial pressure of $CO_2$ in the cathodic channel may be the same as the partial pressure of $CO_2$ in the cathode.

In some further embodiments, the at least one cathodic channel comprises a plurality of hollow fiber membranes. In the some embodiments, the plurality of cathodic channels comprises a plurality of hollow fiber membranes (e.g., 2, 5, 10, 20, 30, 40, 50, 60, 70, 80, 90, 100, or more, hollow fiber membranes). The plurality of hollow fiber membranes may be formed of any of a variety of suitable materials. For example, plurality of hollow fibers may comprise cellulose acetate, polysulfone, polyvinylidene fluoride, or the like. Combinations thereof are also possible (e.g., some hollow fiber membranes formed of cellulose acetate, some hollow fiber membranes formed of polysulfone).

In some embodiments, the anode described herein is at least partially contained within an anodic chamber. In some cases, the anode is at least about 50% by area contained within an anodic chamber, at least about 60% by area contained within an anodic chamber, at least about 70% by area contained within an anodic chamber, at least about 80% by area contained within an anodic chamber, at least about 90% by area contained within an anodic chamber, at least about 95% by area contained within an anodic chamber, at least about 99% by area contained within an anodic chamber, or at least about 100% by area contained within an anodic chamber. According to some embodiments, the anode is entirely contained with an anodic chamber. In some embodiments, the anode or cathode is at least partially contained within an anodic chamber or cathodic chamber, respectively, by forming a portion of the walls that contain the solution in the system. For example, see FIG. 2, wherein cathode 202 forms a wall of the cathodic chamber that can contain the solution within the system.

In certain embodiments, an electrical potential is applied to the system (e.g., the electrochemical cell). The applied electrical potential may be referenced to standards known to those skilled in the art (e.g., referenced to standard hydrogen electrode). The applied electrical potential may have any of a variety of suitable values. For example, the applied electrical potential may be about +/−0.1 volts, about +/−0.2 volts, about +/−0.3 volts, about +/−0.4 volts, about +/−0.5 volts, about +/−0.6 volts, about +/−0.7 volts, about +/−0.8 volts, about +/−0.9 volts, about +/−1 volts, about +/−1.1 volts, about +/−1.2 volts, or about +/−1.3 volts. In certain aspects, the applied electrical potential is less than that required for the oxidation of water (e.g., −1.23 volts versus standard hydrogen electrode). In some embodiments, the applied electrical potential is between about +/−0.1 and about +/−1.3 volts, or between about +/−0.1 and about +/−1.2 volts, or between about +/−0.1 and about +/−1.1 volts, or between about +/−0.1 and about +/−1 volts, or between about +/−0.5 and about +/−0.9 volts, or between about +/−0.5 and about +/−0.8 volts, or between about +/−0.5 and about +/−0.7 volts, or between about +/−1 and about +/−1.2 volts. In certain embodiments, the applied electrical potential is between about +0.5 volts and about +0.8 volts. Those of ordinary skill in the art will be aware of suitable methods and system for applying an electrical potential to a system (e.g., with use of a first electrode, a second electrode, a potentiostat, and/or a power supply).

In some embodiments, a system comprises a membrane separator. According to certain embodiments, the membrane separator may be disposed between the anodic chamber and the cathodic chamber. In certain embodiments, the membrane separator may be in fluid communication with the anodic chamber and/or the cathodic chamber. According to some aspects, the membrane separator is permeable. A membrane separator may be made of any of a variety of suitable materials. For example, the membrane separator may comprise a plastic film. Non-limiting examples of plastic films included include polyamide, polyolefin resins, polyester resins, polyurethane resin, and/or acrylic resins. In some embodiments, the plastic film may comprise lithium carbonate, potassium hydroxide, and/or sodium-potassium peroxide dispersed therein. In some cases, the membrane separator may be an anion exchange membrane and/or cation exchange membrane (i.e., membranes with anion and/or cation exchangeable ions), which are readily available from commercial sources. Non-limiting examples of anionic exchange membranes include poly(ethylene-co-tetrafluoroethylene), poly(hexafluoropropylene-co-tetrafluoroethylene), poly(epichlorhydrin-ally glycidyl ether), poly(ether imide), poly(ethersulfone) cardo, poly(2,6-dimethyl-1,4-phenylene oxide), polysulfone, and/or polyethersulfone, associated with a plurality of cationic species (e.g., quaternary ammonium groups, phosphonium groups, etc.).

In some cases, the complexation agent is capable of associating and/or disassociating $CO_2$ to and/or from the solution. As used herein, a complexation agent generally refers to an agent (e.g., chemical entity) which is capable of associating and/or dissociating with $CO_2$ and/or metal ions. In certain embodiments, the complexation agent is an amine. In some embodiments, the complexation agent is a monoamine. In some embodiments, the complexation agent has the structure $R_3N$, wherein each R is the same or different and is hydrogen, optionally substituted alkyl, optionally substituted heteroalkyl, or optionally substituted aryl. In certain other embodiments, the complexation agent is monoethanolamine. In some embodiments, the complexation agent is a diamine. In some embodiments, the complexation agent has the structure $R_2N$—(R')—$NR_2$, wherein each R is hydrogen, optionally substituted alkyl, optionally substituted heteroalkyl, or optionally substituted aryl, and R' is optionally substituted alkylene, optionally substituted heteroalkylene, optionally substituted arylene, or optionally substituted heteroarylene. In some embodiments, R' is unsubstituted alkylene. In some embodiments, R' is optionally substituted alkylene. In some embodiments, R' is ethylene. In some embodiments, R' is propylene. In some embodiments, each R is hydrogen, In some embodiments, at least one R is hydrogen. In some embodiments, the complexation agent is ethylenediamine. In yet other embodiments, the complexation agent is a triamine. In some embodiments, the complexation agent has the structure $R_2N$—(R')—NR—(R')—$NR_2$, wherein each R is the same or different and is hydrogen, optionally substituted alkyl, optionally substituted heteroalkyl, or optionally substituted aryl, and each R' is the same or different and is optionally substituted alkylene, optionally substituted heteroalkylene, optionally substituted arylene, or optionally substituted heteroarylene.

In some embodiments, each R' is unsubstituted alkylene. In some embodiments, each R' is optionally substituted alkylene. In some embodiments, each R' is ethylene. In some embodiments, each R' is propylene. In some embodiments, each R is hydrogen, In some embodiments, at least one R is hydrogen.

According to some embodiments, the complexation agent in contained in the solution within the system. In some embodiments, the system comprises a solution containing a complexation agent capable of associating and/or disassociating $CO_2$ and/or metal ions to and/or from the solution upon exposure to an electrical potential. In some cases the complexation agent is selected such that the phase (e.g., solid, liquid, in solution) does not change upon application of an electrical potential. As will be understood by those of ordinary skill in the art, if solutions are being added or removed, loss of the redox agent should be avoided, e.g., through appropriate separation techniques at any outlets. In some cases, the system and/or method may comprise more than one type of complexation agent (e.g., a first type of complexation agent and a second type of complexation agent different from the first type of complexation agent).

In some embodiments, the complexation agent is provided in a solution. The concentration of the complexation agent in the solution may be about 0.1 M, about 0.2 M, about 0.3 M, about 0.4 M, about 0.5 M, about 0.6 M, about 0.7 M, about 0.8 M, about 0.9 M, about 1 M, about 1.2 M, about 1.4 M, about 1.5 M, about 1.75 M, about 2 M, or about 2.5 M or greater. In some embodiments, the concentration of the complexation agent is between about 0.1 M and about 2.5 M, or between about 0.1 M and about 2 M, or between about 0.1 M and about 1.5 M, or between about 0.1 M and about 1 M, or between about 0.1 M and about 0.9 M, or between about 0.5 M and about 2 M, or between about 0.5 M and about 1 M. According to certain embodiments, the relative concentration of the complexation agent may be higher (e.g., in excess) than other components in the solution (e.g., metal ions and/or electrolyte).

In some cases, the association and/or dissociation of $CO_2$ and/or metal ions to and/or from the complexation agent requires an applied electrical potential. For example, the applied electrical potential may be about +/−0.1 volts, about +/−0.2 volts, about +/−0.3 volts, about +/−0.4 volts, about +/−0.5 volts, about +/−0.6 volts, about +/−0.7 volts, about +/−0.8 volts, about +/−0.9 volts, about +/−1 volts, about +/−1.1 volts, about +/−1.2 volts, or about +/−1.3 volts. In some cases, the applied electrical potential is less than that required for the oxidation of water (e.g., −1.23 volts versus standard hydrogen electrode). In some embodiments, the applied electrical potential is between about +/−0.1 and about +/−1.3 volts, or between about +/−0.1 and about +/−1.2 volts, or between about +/−0.1 and about +/−1.1 volts, or between about +/−0.1 and about +/−1 volts, or between about +/−0.5 and about +/−0.9 volts, or between about +/−0.5 and about +/−0.8 volts, or between about +/−0.5 and about +/−0.7 volts, or between about +/−1 and about +/−1.2 volts. In certain embodiments, the applied electrical potential is between about +0.5 volts and about +0.8 volts. Those of ordinary skill in the art will be aware of suitable methods and system for applying an electrical potential to a complexation agent (e.g., with use of a first electrode, a second electrode, a potentiostat, and/or a power supply).

In some embodiments, the metal ions are metal ions of tin, nickel, platinum, gold, silver, copper, or the like. In some cases, the metal ions are copper ions. According to certain embodiments, the metal ions may be a portion of an electrode, and/or may be associated with an electrode (e.g., anode and/or cathode). In some embodiments, the metal ions are associated with an electrode and/or forms the electrode such that the solution contains substantially no metal ions. In yet another embodiment, the metal ions are in solution and upon application of an electrical potential to the solution using an electrode, the metal ions form a material associated with the electrode and/or a solid in the solution wherein the solid can be contained (e.g., by settling, filtration) and the solution contains essentially no metal ions. According to certain embodiments, the metal ions are associated with an electrode and/or forms the electrode such that upon application of an electrical potential to the system, metal ions are reduced at the cathode and/or oxidized at the anode. According to certain embodiments, the metal ions are generated from application of an electrical potential (e.g., oxidation and/or reduction) of the metal electrode.

In certain embodiments, the metal ions preferentially bind the complexation agent (e.g., amine). According to some embodiments, upon preferential binding of the metal ions to the complexation agent, $CO_2$ disassociates from the complexation agent.

In some embodiments, the metal ions are provided as a solid. In some cases, the metal ions may be formed on the surface of a substrate which is functioning as an electrode. In some cases, the electrode may comprise the metal ions. In some cases, the electrode comprises the metal ions, wherein at least about 10%, at least about 20%, at least about 30%, at least about 40%, at least about 50%, at least about 60%, at least about 70%, at least about 80%, at least about 90%, at least about 95%, at least about 98%, at least about 99%, or more, of the electrode by weight are the metal ions.

In some embodiments, the metal ions are provided in a solution. The concentration of the metal ions in the solution may be about 0.1 M, about 0.2 M, about 0.3 M, about 0.4 M, about 0.5 M, about 0.6 M, about 0.7 M, about 0.8 M, about 0.9 M, about 1 M, about 1.2 M, about 1.4 M, about 1.5 M, about 1.75 M, about 2 M, or about 2.5 M or greater. In some embodiments, the concentration of the metal ions is between about 0.1 M and about 2.5 M, or between about 0.1 M and about 2 M, or between about 0.1 M and about 1.5 M, or between about 0.1 M and about 1 M, or between about 0.1 M and about 0.9 M, or between about 0.5 M and about 2 M, or between about 0.5 M and about 1 M. According to certain embodiments, the relative concentration of the metal ions may be higher (e.g., in excess) than other components in the solution (e.g., complexation agent and/or electrolyte). According to certain other embodiments, the relative concentration of the metal ions may be lower (e.g., not in excess) than other components in the solution (e.g., complexation agent and/or electrolyte).

In certain embodiments, the system comprises a solution comprising a complexation agent, metal ions, and an electrolyte. In some embodiments, the solution comprises water. In some cases, the solution comprises a mixture of solvents, such as water, organic solvents, amines, and the like. In some embodiments, the solution comprises water, an amine (e.g., for association with copper), and one or more additives (e.g., a salt, as described in more detail herein). In some embodiments, the amine is present in a concentration between about 0.5 M and about 2 M, or between about 0.5 M and about 1.5 M, or between about 1 M and about 1.5 M, or about 1 M.

In some embodiments, the solution, in addition to comprising the complexation agent and/or the metal ions, comprises or functions as an electrolyte. An electrolyte, as known to those of ordinary skill in the art, is a substance containing free ions that is capable of functioning as an ionically conductive medium. In some cases, the electrolyte is a solid (e.g., alkali metal salts, gel electrolytes, polymer electrolytes, and the like). In some other embodiments, the electrolyte is a liquid (e.g., amines, and the like). In some embodiments, the solution comprises one or more electrolytes. In certain embodiments, the electrolyte is an additive that is provided to the solution (e.g., a salt added to water). Addition of an electrolyte to the solution may have many benefits. For example, addition of an electrolyte may increase the energy efficiency of removal of $CO_2$ in the system and/or method, and/or the formation and removal of the complexation agent by application of an electrical potential. Generally, the electrolyte is not consumed by the reaction.

In some embodiments, the electrolyte is present in a concentration between about 0.5 M and about 5 M, between about 1 M and about 5 M, between about 1 M and about 3 M, or about 2 M. In some embodiments, the electrolyte is a salt. In some embodiments, the electrolyte comprises the structure $[M]^{p+}[X]^{p-}$ or $n[M]^{m+}m[X]^{n-}$, wherein $[M]^{p+}$ and $[M]^{m+}$ are cations, $[X]^{p-}$ and $[X]^{n-}$ are anions, each p is 1, 2, 3, or 4, and m and n are different and are 1, 2, 3, or 4. In some embodiments, each p is 1. In some embodiments, each p is 2. In some embodiments, the additive comprises a metal salt, for example, an alkali metal salt or an alkaline metal salt. In some embodiments, $[M]^{p+}$ or $[M]^{m+}$ is an alkali metal ion. In some embodiments, $[M]^{p+}$ or $[M]^{m+}$ is an alkaline metal ion. In some embodiments, $[M]^{p+}$ or $[M]^{m+}$ is sodium. In some embodiments $[M]^{p+}$ or $[M]^{m+}$ is $NR^{4+}$, wherein each R is the same or different and is hydrogen, optionally substituted alkyl, optionally substituted heteroalkyl, optionally substituted aryl, or optionally substituted heteroaryl. In some embodiments, $[M]^{p+}$ or $[M]^{m+}$ is $NH_4^+$. Other non-limiting examples of cations include $K^+$, $Li^+$, $Mg^{+2}$, $Ca^{+2}$, and $Sr^{+2}$. In some embodiments, $[X]^{p-}$ or $[X]^{n-}$ is a halide. In some embodiments, $[X]^{p-}$ or $[X]^{n-}$ is bromide. In some embodiments, $[X]^{p-}$ or $[X]^{n-}$ is chloride. In some embodiments, $[X]^{p-}$ or $[X]^{n-}$ is carbonate. Other non-limiting embodiments of anions will be known to those of ordinary skill in the art, for example, $CO_3^{-2}$, $SO_4^{-2}$, $SO_3^{-2}$, $PO_4^{-2}$, and $PO_3^{-3}$.

According to some embodiments, the feed gas may comprise more than one gas (e.g., 2, 3, 4 gases, etc.). For example, the feed gas may comprise $CO_2$, and also may comprise other inert gases including $N_2$, Ar, Xe, Ne, He, and the like. In some aspects, the feed gas may also comprise other chemically active gases including, $O_2$, $H_2$, $CH_4$, and the like. In embodiments where chemically active gases (e.g., $O_2$) are included in the feed gas stream, no unwanted reactivity is observed (e.g., oxidation of Cu metal). According to certain embodiments, the feed gas stream directly comprises atmospheric gas. In certain other embodiments, the feed gas stream comprises emissions from sources such as coal- or natural gas-fired power plants. According to some embodiments, the feed gas stream may comprise only $CO_2$.

In some embodiments, the systems and/or methods may be used in applications involving $CO_2$ gas scrubbing. Gas scrubbing is commonly employed to prevent the release of toxic chemicals (e.g., ammonia or hydrochloric acid) as well as greenhouse gases (e.g., sulfur dioxide) which are produced as byproduct in a variety of reactions.

In certain embodiments, the system is an electrochemical cell. The electrochemical cell may be any of a variety of receptacles, such as a carton, can, or jar, in which components of a system may be held or carried. An electrochemical cell may be fabricated using any known techniques or materials, as will be known to those of ordinary skill in the art. For example, in some instances, the electrochemical cell may be fabricated from polymer, metal, and the like. The electrochemical cell may have any of a variety of suitable shapes and/or sizes, providing it can contain the components of the system. Components of the system may be mounted in the electrochemical cell. That is, a component (e.g., an electrode) may be associated with the electrochemical cell such that it is immobilized with respect to the electrochemical cell, and in some cases, is supported by the electrochemical cell. A component may be mounted to the electrochemical cell using any common method and/or material known to those skilled in the art (e.g., screws, wires, adhesive, etc.). The component may or might not physically contact the electrochemical cell. In some cases, an electrode may be mounted in the electrochemical cell such that the electrode is not in contact with the electrochemical cell, but is mounted in the electrochemical such that it is suspended in the electrochemical cell.

In some embodiments, a system comprises at least one electrode, or at least two electrode, or two electrodes. According to certain embodiments, the two electrodes are a cathode and an anode. In some aspects, an electrode comprises metal ions, as described herein. In embodiments, wherein the electrode is not formed of the metal ions, an electrode may comprise any material that is substantially electrically conductive. The electrode may be transparent, semi-transparent, semi-opaque, and/or opaque. The electrode may be a solid, semi-porous, or porous. Non-limiting examples of electrodes include indium tin oxide (ITO), fluorine tin oxide (FTO), glassy carbon, metals, lithium-containing compounds, metal oxides (e.g., platinum oxide, nickel oxide), graphite, nickel mesh, carbon mesh, and the like. Non-limiting examples of suitable metals include gold, copper, silver, platinum, nickel, cadmium, tin, and the like. In some instances, the electrode may comprise nickel (e.g., nickel foam or nickel mesh). The electrodes may also be any other metals and/or non-metals known to those of ordinary skill in the art as conductive (e.g., ceramics). The electrode may be of any of a variety of suitable sizes and/or shapes. Non-limiting examples of shapes include sheets, cubes, cylinders, hollow tubes, spheres, and the like. Additionally, the electrode may comprise a means to connect the electrode to another electrode, a power source, and/or another electrical device.

In some embodiments, an electrode may be utilized which comprises a different material than the metal ions, and the metal ions may be provided in solution and may associate and/or dissociate from the electrode during operation (e.g., via intercalation and/or de-intercalation). For example, the system may employ solutions comprising amines, the use of suspended copper and copper oxide particles with glassy carbon electrodes instead of Cu/CuO electrodes, and/or other complexation agents. During operation, copper may associate and/or dissociate (e.g., intercalate and/or de-intercalate) with one or more of the electrodes.

In some embodiments, an electrode is utilized comprising a porous material, wherein the metal ions intercalate into and/or de-intercalate from the electrode during operation of a system and/or a method. The term intercalate is given its ordinary meaning in the art and refers to the ability of an ion (e.g., a metal ion such as copper) to insert into an electrode. An ion is said to reversibly intercalate if it can de-intercalate (e.g., deinsert), without unduly stressing the electrode, so that electrode performance is maintained over repeated cycling. For example, in some embodiments, the electrode comprises a porous material and the metal ion (e.g., copper) reversibly intercalates into the electrode by plating on the surface (e.g., include any pores, if present). In some embodiments, both the anode and the cathode are constructed such that metal ions reversibly intercalate.

In some embodiments, use of a porous electrode as an intercalation/de-intercalation material for the complexation agent provides many advantages over use of a solid electrode with a solubilized complexation agent and/or an electrode formed of the complexation agent. For example, utilizing a intercalation/de-intercalation material may significantly improve the cycling stability of a system and/or a method, as the porous structure improves order and/or reversibility of the system and/or method as compared to use of a solid electrode formed of the complexation material and/or an electrode formed of material other than the complexation agent, wherein the complexation agent associates and/or dissociates from the outer surface of the electrode (e.g., a non-porous electrode).

The porous electrode may be made of any of a variety of suitable materials and/or may comprise any of a variety of suitable shapes and/or sizes. In a non-limiting embodiment, the electrode comprises a porous carbonaceous material. The term carbonaceous material is given its ordinary meaning in the art and refers to a material comprising carbon or graphite that is electrically conductive. Non-limiting examples of carbonaceous materials include carbon nanotubes, carbon fibers (e.g., carbon nanofibers), and/or graphite. It should be understood that an electrode that comprises a carbonaceous material may be an electrode which consists or consists essentially of the carbonaceous material, or may be an electrode in which only a portion of the electrode comprises a carbonaceous material. For example, at least a portion of the electrode in electrical contact with the electrolyte may comprise a carbonaceous material. In such embodiments, the electrode may be partially fabricated from the carbonaceous material or the carbonaceous material may be deposited over an underlying material. The underlying material generally comprises a conductive material, for example, a metal. Other non-limiting examples of conductive materials are described herein.

In some embodiments, the electrode is porous. The porosity of an electrode may be measured as a percentage or fraction of the void spaces in the photoactive electrode. The percent porosity of an electrode may be measured using techniques known to those of ordinary skill in the art, for example, using volume/density methods, water saturation methods, water evaporation methods, mercury intrusion porosimetry methods, and nitrogen gas adsorption methods. In some embodiments, the electrode may be at least about 10% porous, at least about 20% porous, at least about 30% porous, at least about 40% porous, at least about 50% porous, at least about 60% porous, or greater. The pores may be open pores (e.g., have at least one part of the pore open to an outer surface of the electrode and/or another pore) and/or closed pores (e.g., the pore does not comprise an opening to an outer surface of the electrode or another pore). In some cases, the pores of an electrode may consist essentially of open pores (e.g., the pores of the electrode are greater than at least 70%, greater than at least 80%, greater than at least 90%, greater than at least 95%, or greater, of the pores are open pores). In some embodiments, only a portion of the electrode may be substantially porous. For example, in some aspects, only a single surface of the electrode may be substantially porous. As another example, in some aspects, the outer surface of the electrode may be substantially porous and the inner core of the electrode may be substantially non-porous. In a particular embodiment, the entire electrode is substantially porous.

The methods and/or systems may be utilized at any of a variety of suitable temperatures. In some embodiments, the methods and/or systems are operated at about room temperature (e.g., about 25° C.). In some embodiments, the methods and/or systems are operated at a temperature between about 25° C. and about 100° C., between about 25° C. and about 90° C., between about 25° C. and about 80° C., between about 25° C. and about 75° C., or between about 25° C. and about 70° C. In some embodiments, the methods and/or systems are operated at a temperature less than 100° C.

Various components of a system, such as the electrode, power source, electrolyte, separator, container, circuitry, insulating material, and the like may be fabricated by those of ordinary skill in the art from any of a variety of components. Components may be molded, machined, extruded, pressed, isopressed, infiltrated, coated, or formed by any other suitable technique. Those of ordinary skill in the art are readily aware of techniques for forming components of system herein.

Various electrical components of a system may be in electrical communication with at least one other electrical component by a means for connecting. A means for connecting may be any material that allows the flow of electricity to occur between a first component and a second component. A non-limiting example of a means for connecting two electrical components is a wire comprising a conductive material (e.g., copper, silver, etc.). In some cases, the system may also comprise electrical connectors between two or more components (e.g., a wire and an electrode). In some cases, a wire, electrical connector, or other means for connecting may be selected such that the resistance of the material is low. In some cases, the resistances may be substantially less than the resistance of the electrodes, electrolyte, and/or other components of the system.

In some embodiments, a power source may supply DC voltage (e.g., potential) to a system. Non-limiting examples include batteries, power grids, regenerative power supplies (e.g., wind power generators, photovoltaic cells, tidal energy generators), generators, and the like. The power source may comprise one or more such power supplies (e.g., batteries and a photovoltaic cell). In a particular embodiment, the power supply is a photovoltaic cell.

Reagents may be supplied to and/or removed from a system using a commonly known transport device. The nature of the reagent delivery may vary with the type of fuel and/or the type of device. For example, solid, liquid, and gaseous reagents may all be introduced in different manners. The reagent transport device may be a gas or liquid conduit such as a pipe or hose which delivers or removes fuel, such as hydrogen gas or methane, from the system and/or from the reagent storage device. Alternatively, the system may comprise a movable gas or liquid storage container, such as a gas or liquid tank, which may optionally be physically removed from the system after the container is filled with reagent.

According to certain embodiments, the systems and/or methods described herein may be applied in any of a variety of suitable techniques, including, but not limited to, removal of $CO_2$ from emission streams, including exhaust gas produced by coal- or natural gas-fired power plants, cement production, aluminum production, and the like. In some embodiments, $CO_2$ can be removed directly from the atmosphere. In certain embodiments, the removed $CO_2$ can be utilized for a wide variety of techniques (e.g., enhanced oil recovery, natural gas sweetening, and the like). In other certain embodiments, the removed $CO_2$ can be stored.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure.

The term "heteroalkyl" is given its ordinary meaning in the art and refers to alkyl groups as described herein in which one or more atoms is a heteroatom (e.g., oxygen, nitrogen, sulfur, and the like).

The term "aryl" is given its ordinary meaning in the art and refers to single-ring aromatic groups such as, for example, 5-, 6- and 7-membered single-ring aromatic groups. The term "heteroaryl" is given its ordinary meaning in the art and refers to aryl groups as described herein in which one or more atoms is a heteroatom (e.g., oxygen, nitrogen, sulfur, and the like). Examples of aryl and heteroaryl groups include, but are not limited to, phenyl, pyrrolyl, furanyl, thiophenyl, imidazolyl, oxazolyl, thiazolyl, triazolyl, pyrazolyl, pyridinyl, pyrazinyl, pyridazinyl and pyrimidinyl, and the like. It should be understood that, when aryl and heteroaryl groups are used as ligands coordinating a metal center, the aryl and heteroaryl groups may have sufficient ionic character to coordinate the metal center. For example, when a heteroaryl group such as pyrrole is used as a nitrogen-containing ligand, as described herein, it should be understood that the pyrrole group has sufficient ionic character (e.g., is sufficiently deprotonated to define a pyrrolyl) to coordinate the metal center. In some cases, the aryl or heteroaryl group may comprise at least on functional group that has sufficient ionic character to coordinate the metal center, such as a biphenolate group, for example.

The term "amino," as used herein, refers to a primary ($-NH_2$), secondary ($-NHR_x$), tertiary ($-NR_xR_y$), or quaternary ($-N^+R_xR_yR_z$) amine, where $R_x$, $R_y$, and $R_z$ are independently an aliphatic, alicyclic, heteroaliphatic, heterocyclic, aryl, or heteroaryl moiety, as defined herein. Examples of amino groups include, but are not limited to, methylamino, dimethylamino, ethylamino, diethylamino, methylethylamino, iso-propylamino, piperidino, trimethylamino, and propylamino.

The term "alkoxy" (or "alkyloxy"), or "thioalkyl" as used herein refers to an alkyl group, as previously defined, attached to the parent molecular moiety through an oxygen atom or through a sulfur atom. In certain embodiments, the alkyl group contains 1-20 aliphatic carbon atoms. In certain other embodiments, the alkyl group contains 1-10 aliphatic carbon atoms. In yet other embodiments, the alkyl, alkenyl, and alkynyl groups employed in the invention contain 1-8 aliphatic carbon atoms. In still other embodiments, the alkyl group contains 1-6 aliphatic carbon atoms. In yet other embodiments, the alkyl group contains 1-4 aliphatic carbon atoms. Examples of alkoxy, include but are not limited to, methoxy, ethoxy, propoxy, isopropoxy, n-butoxy, t-butoxy, neopentoxy and n-hexoxy. Examples of thioalkyl include, but are not limited to, methylthio, ethylthio, propylthio, isopropylthio, n-butylthio, and the like.

Generally, the suffix "-ene" is used to describe a bivalent group. Thus, any of the terms defined herein can be modified with the suffix "-ene" to describe a bivalent version of that moiety. For example, a bivalent carbocycle is "carbocyclylene", a bivalent aryl ring is "arylene", a bivalent benzene ring is "phenylene", a bivalent heterocycle is "heterocyclylene", a bivalent heteroaryl ring is "heteroarylene", a bivalent alkyl chain is "alkylene", a bivalent alkenyl chain is "alkenylene", a bivalent alkynyl chain is "alkynylene", a bivalent heteroalkyl chain is "heteroalkylene", a bivalent heteroalkenyl chain is "heteroalkenylene", a bivalent heteroalkynyl chain is "heteroalkynylene", and so forth.

As used herein, the term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" group must still comprise the phenyl moiety and cannot be modified by substitution, in this definition, to become, e.g., a cyclohexyl group. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. In certain embodiments, the heteroatoms such as nitrogen may have hydrogen substituents and/or any permissible substituents of organic compounds described herein which satisfy the valencies of the heteroatoms. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. This invention is not intended to be limited in any manner by the permissible substituents of organic compounds.

Examples of substituents include, but are not limited to, lower alkyl, lower aryl, lower aralkyl, lower cyclic alkyl, lower heterocycloalkyl, hydroxy, lower alkoxy, lower aryloxy, perhaloalkoxy, aralkoxy, lower heteroaryl, lower heteroaryloxy, lower heteroarylalkyl, lower heteroaralkoxy, azido, amino, halogen, lower alkylthio, oxo, lower acylalkyl, lower carboxy esters, carboxyl, -carboxamido, nitro, lower acyloxy, lower aminoalkyl, lower alkylaminoaryl, lower alkylaryl, lower alkylaminoalkyl, lower alkoxyaryl, lower arylamino, lower aralkylamino, lower alkylsulfonyl, lower-carboxamidoalkylaryl, lower-carboxamidoaryl, lower hydroxyalkyl, lower haloalkyl, lower alkylaminoalkylcarboxy-, lower aminocarboxamidoalkyl-, cyano, lower alkoxyalkyl, lower perhaloalkyl, lower arylalkyloxyalkyl, and the like.

The following examples are intended to illustrate certain embodiments of the present invention, but do not exemplify the full scope of the invention.

Example 1

This example describes an exemplary system and method for at least partially removing $CO_2$ from a feed gas comprising $CO_2$.

Electrochemically mediated amine recovery is a post-combustion $CO_2$ capture process. As in the traditional thermal amine process, the electrochemically mediated amine recovery process uses amine absorbents at low temperature to extract $CO_2$ from a feed gas stream. The $CO_2$ bound sorbent is then fed to the anodic channel of an electrochemical cell. Copper metal is oxidized and the resulting cupric ions complex the previously $CO_2$ bound amines, causing $CO_2$ release and desorption. After separating the gas and liquid streams, the liquid stream is brought to the cathodic chamber of the electrochemical cell where the copper-amine complex is reduced, plating out the copper and refreshing the amines for addition capture in the absorber.

Electrochemically mediated amine recovery provides a few key advantages over traditional thermal amine scrubbing. Thermodynamically, the electrochemically mediated amine recovery process is twice as efficient and of comparable efficiency to the thermal amine process. This example discusses geometries which will further improve that efficiency.

Electrochemically mediated amine recovery also has advantages from a capital standpoint. Electrochemically mediated amine recovery more easily integrates with existing infrastructure. Since electrochemically mediated amine recovery is an entirely electrically driven process, it does not require the installation of a reboiler as does the thermal amine process. Furthermore, the electrochemically mediated amine recovery process allows for high pressure desorption of $CO_2$ for compression. The high temperature required for high pressure desorption in the thermal case generally causes amine degradation, though some amines such as piperazine are resistant to this degradation. High pressure $CO_2$ release decreases the compression ratio seen in the compressor, thereby decreasing the compressor size and capital cost. The work of compression also decreases at the cost of more energy intensive amine regeneration.

The state of any liquid stream in the electrochemically mediated amine recovery process may be described by the process variables given in Table 1.

TABLE 1

Process variables with describe the state of a liquid EMAR stream.

| | |
|---|---|
| Total Amine Concentration | $Am_0 = C_{Am} + C_{Am(CO_2)_m} + \frac{2}{m}C_{Cu^{II}Am_{2/m}^{2+}}$ |
| Copper Loading | $x_{Cu} = \frac{2C_{Cu^{II}Am_{2/m}^{2+}}}{mAm_0} \approx \frac{2Cu_0}{mAm_0}$ |
| Effective $CO_2$ Loading | $x_{CO_2,0} = \frac{C_{CO_2} + mC_{Am(CO_2)_m}}{mAm_0} = \frac{CO_{2,0}}{mAm_0}$ |
| $CO_2$ Partial Pressure | $P_{CO_2} = \frac{C_{CO_2}}{k_{h,CO_2}}$ |

The total amine concentration ($Am_0$) describes the total concentration of all amines in the liquid in any form (bound to carbon dioxide, bound to copper, or unbound). The copper loading ($x_{Cu}$) describes the fraction of those amines which are bound to copper. Assuming that amines are in excess and the binding constant between amines and copper ($\beta$) is quite high, a copper loading of $$x_{Cu} \approx \frac{2Cu_0}{mAm_0}$$

is provided. Similarly, the effective carbon dioxide loading ($x_{CO_{2,0}}$) may be defined as the total dissolved $CO_2$ concentration (bound or unbound to amines), normalized by the total amine concentration. Finally, the carbon dioxide partial pressure ($P_{CO_2}$) of any liquid electrochemically mediated amine recovery stream is related to the concentration of dissolved, unbound $CO_2$ by the Henry's law constant ($k_{h,CO_2}$).

Copper loading, effective $CO_2$ loading, and carbon dioxide partial pressure are related as given in equation 1.

$$x_{CO_{2,0}} - \tilde{k}_{h,CO_2} \tilde{P}_{CO_2} = (1 - x_{Cu})\left(\frac{K_{CO_2}\tilde{P}_{CO_2}^m}{1 + K_{CO_2}\tilde{P}_{CO_2}^m}\right) \quad (1)$$

In equation 1, $$\tilde{P}_{CO_2} = \frac{P_{CO_2}}{P_0}$$

is the dimensionless carbon dioxide partial pressure and $$\tilde{k}_{h,CO_2} = \frac{k_{h,CO_2} P_0}{mAm_0}$$

is the dimensionless Henry's law constant.

In order for carbon dioxide to be released from the anode, copper loading must be sufficiently increased to bring the $CO_2$ partial pressure of the anodic stream up to the pressure of the electrochemically mediated amine recovery cell, $P_{EMAR}$, where EMAR is electrochemically mediated amine recovery. Therefore, for a given desorption pressure, there is a minimum required copper loading shift in which no carbon dioxide will be released from the desorber. Similarly, for a given copper loading shift, there is a maximum achievable desorption pressure. Specifically, the effective $CO_2$ loading of the anodic outlet is less than the effective $CO_2$ loading of the anodic inlet. Thus, the relationship between desorption pressure and copper loading shift is a direct consequence of equation 1 and is given by equation 2.

$$(1 - x_{Cu,in})\left(\frac{K_{CO_2}\tilde{P}_{abs}^m}{1 + K_{CO_2}\tilde{P}_{abs}^m}\right) + \tilde{k}_{h,CO_2}\tilde{P}_{abs} > \quad (2)$$

$$(1 - x_{Cu,out})\left(\frac{K_{CO_2}\tilde{P}_{EMAR}^m}{1 + K_{CO_2}\tilde{P}_{EMAR}^m}\right) + \tilde{k}_{h,CO_2}\tilde{P}_{EMAR}$$

This inequality may be simplified to equation 3 for typical conditions experienced in an electrochemically mediated amine recovery cycle. The result is fairly intuitive, that we require an anime copper loading shift sufficient to bind the dissolved $CO_2$ in the anode at desorption pressure less the entering dissolved $CO_2$.

$$\Delta x_{Cu} < \tilde{k}_{h,CO_2}(\tilde{P}_{EMAR} - \tilde{P}_{abs}) \quad (3)$$

The open circuit voltage (OCV) of an electrochemically mediated amine recovery stream as a function of $P_{CO_2}$ is given in equation 4.

$$E = E^\circ + \frac{RT}{2F}\left[\ln(x_{Cu}) + \ln\left(\frac{mAm_0}{2}\right) - \ln\left(1 + \beta\left[\frac{\tilde{A}m_0(1 - x_{Cu})}{1 + K_{CO_2}\tilde{P}_{CO_2}^m}\right]^{2/m}\right)\right] \quad (4)$$

where $\tilde{A}m_0 = Am_0/C_0$. Note that $C_0$ is the standard concentration.

Figure 5A:
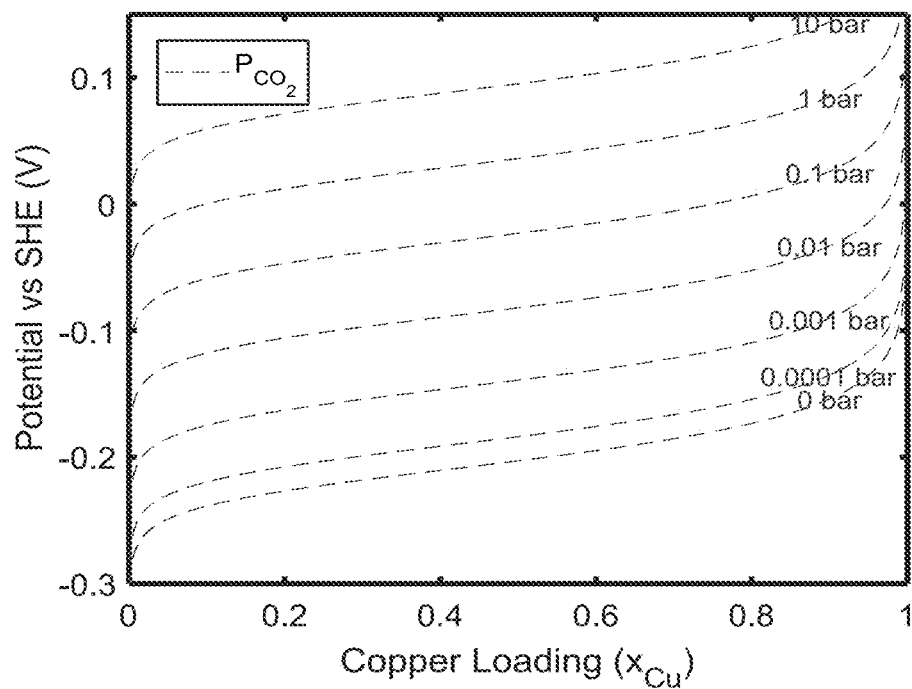
FIG. 5A shows the open circuit potential versus the standard hydrogen electrode as a function of copper loading for constant $CO_2$ partial pressure, according to some embodiments.
Figure 5B:
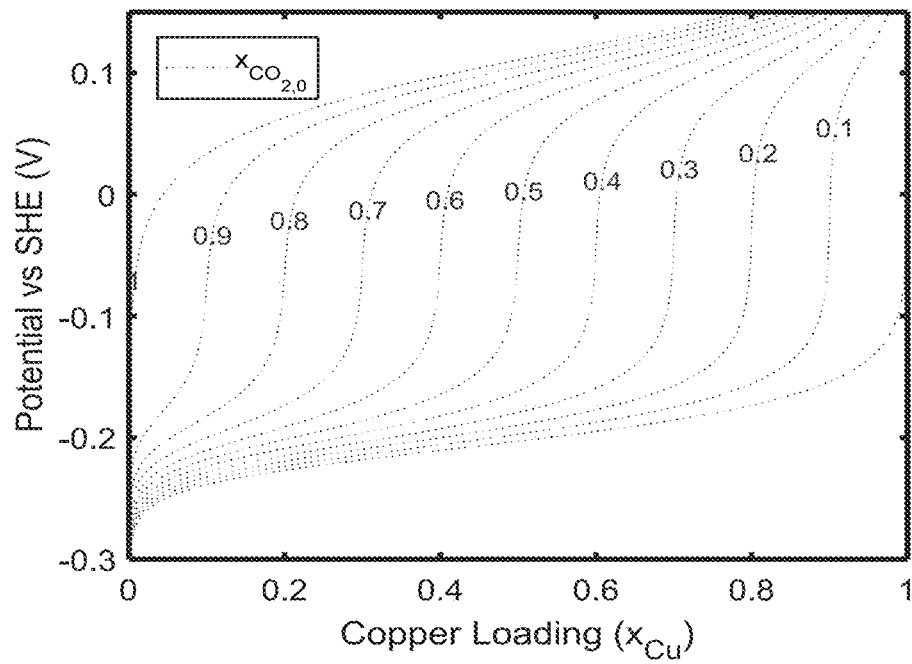
FIG. 5B shows the open circuit potential versus the standard hydrogen electrode as a function of copper loading for constant effective $CO_2$ loading, according to some embodiments.

Equation 4 may be used to establish constant $P_{CO_2}$ profiles for the open circuit potential as a function of copper loading. Similarly, equation 4 may be combined with equation 1 to create constant effective $CO_2$ profiles for OCV as given by FIG. 5A and FIG. 5B. These two equations may be used in concert to establish a thermodynamic cycle for electrochemically mediated amine recovery, which will define the work of regeneration as given by equation 5.

$$W = \oint_{(E_a - E_c)dx_{Cu}} EdQ = F \cdot Am_0 \cdot \oint Edx_{Cu} = F \cdot Am_0 \cdot \int_{x_{Cu,min}}^{x_{Cu,max}} \quad (5)$$

where W is the work required for regeneration, Q is the state of charge, $X_{Cu,min}$ and $X_{Cu,max}$ are the anodic inlet copper loading and cathodic inlet copper loadings respectively, and $E_a$ and $E_c$ are the open circuit potentials, which change with copper loading for the anodic and cathodic flows respectively.

Three thermodynamic paths exist for an electrochemical carbon dioxide capture system: (i) Constant $CO_2$ partial pressure, which is observed in cathodic absorption or anodic desorption regimes, wherein this path maintains a constant $CO_2$ partial pressure while changing both state of charge and total $CO_2$ concentration in the liquid; (ii) Constant total $CO_2$ concentration, which is observed in cathodic or anodic regimes that do not include absorption or desorption, wherein this path maintains a constant total $CO_2$ concentration in the liquid while changing both state of charge and partial pressure of $CO_2$; and (iii) Constant state of charge, which is seen in non-electrochemical regimes like absorption or desorption, wherein this path maintains a constant state of charge while changing both $CO_2$ partial pressure and total $CO_2$ concentration in the liquid.

The electrochemically mediated amine recovery process traverses the three states. The anodic channel connects the anodic path. Similarly, the cathodic path and the absorber path are connected.

The absorber liquid is in equilibrium with the feed gas stream, which has a $CO_2$ partial pressure of $P_{abs} = y_{CO_2,feed} \cdot P_{abs,total}$. As this liquid enters the anode, copper metal is corroded resulting in cupric ions, which bind amines as shown in equation 6. This in turn increases the partial pressure of $CO_2$, $P_{CO_2}$, in the liquid.

$$\frac{2}{m}Am(CO_2)_m(aq) + Cu(s) \rightleftharpoons Cu^{II}Am_{2/m}^{2+}(aq) + 2CO_2(aq) + 2e^- \quad (6)$$

The total pressure of the electrochemically mediated amine recovery cell be $P_{EMAR}$ and note $P_{abs} < P_{EMAR}$—otherwise a pressure swing absorption process would be observed. When a copper loading shift occurs sufficient to increase $P_{CO_2}$ to match $P_{EMAR}$, $CO_2$ gas begins to evolve and $P_{CO_2}$ remains constant. Carbon dioxide leaving the liquid decreases effective $CO_2$ loading, $x_{CO_{2,0}}$, as more copper is added. The anodic path therefore has two stages: Stage 1, which is a constant effective $CO_2$ loading path, while partial pressure of $CO_2$ increases from $P_{abs}$ to $P_{EMAR}$; and stage 2, which is a constant partial pressure of $CO_2$ at $P_{EMAR}$ path, while effective $CO_2$ loading decreases.

The cathodic path is more simple, as no carbon dioxide is evolved. After the stream exiting the anode is stripped of gaseous $CO_2$ in the gas/liquid separator, the liquid enters the cathode where the electrochemical reaction given in equation 7 occurs. The decreasing copper loading decreases $P_{CO_2}$, while effective $CO_2$ loading remains constant as no carbon dioxide has entered or left the liquid. Therefore, the cathodic path, by contrast to the anodic path, is a single continuous stage.

Liquid leaving the cathode has free amines available to bind $CO_2$ in the absorber, where no electrochemical reaction occurs. Thus, the absorber path increases $P_{CO_2}$ and $x_{CO_{2,0}}$ in the stream at a constant copper loading (e.g., a constant state of charge).

The thermodynamic work of amine regeneration and $CO_2$ release is a function of the path integral of the electrochemically mediated amine recovery cycle as given by equation 5. However, two other unit operations draw power in the electrochemically mediated amine recovery process: the pump and the compressor. The compressor increases outlet $CO_2$ pressure from $P_{EMAR}$ to storage pressure, $P_{store}$. The pump circulates the electrochemically mediated amine recovery liquid and raises its pressure from absorption pressure (likely atmospheric) to $P_{EMAR}$ before entering the desorber. Pump work per mole of $CO_2$ captured is given by equation 8. For simplicity, isothermal compression is assumed to calculate the work of compression per mole of $CO_2$ captured.

$$\overline{W}_{pump} = \frac{P_{EMAR} - P_{Abs}}{Am_0 \cdot (x_{CO_{2,0},anode,in} - x_{CO_{2,0},cathode})} \quad (8)$$

Figure 6A:
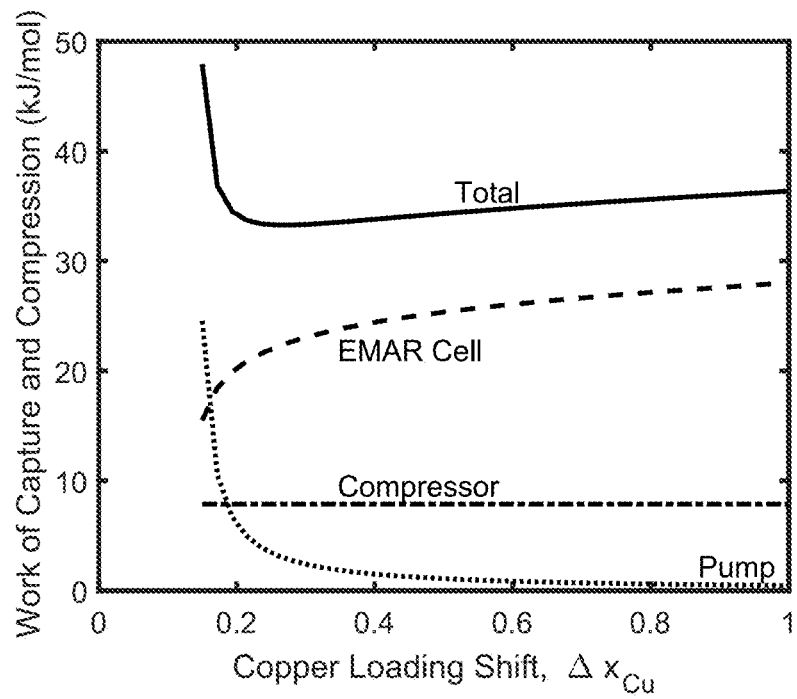
FIG. 6A shows the work of capture and compression versus copper loading shift, according to some embodiments.

By considering the work of regeneration, pumping, and compression, we can analyze the effect of copper loading shift and electrochemically mediated amine recovery desorption pressure, among other variables, on the total work of $CO_2$ capture. A sample of this analysis is given in FIG. 6A and FIG. 6B. As seen in FIG. 6A, for a given electrochemically mediated amine recovery desorption pressure, an ideal copper loading shift exists, though the effect of copper loading shift on the total work of the system is minimal. At low copper loading shifts, the electrochemical work of capture is minimized, however pump work is increased significantly especially as the copper loading shift approaches minimum. This asymptotic behavior is clear from the denominator of equation 8.

Figure 6B:
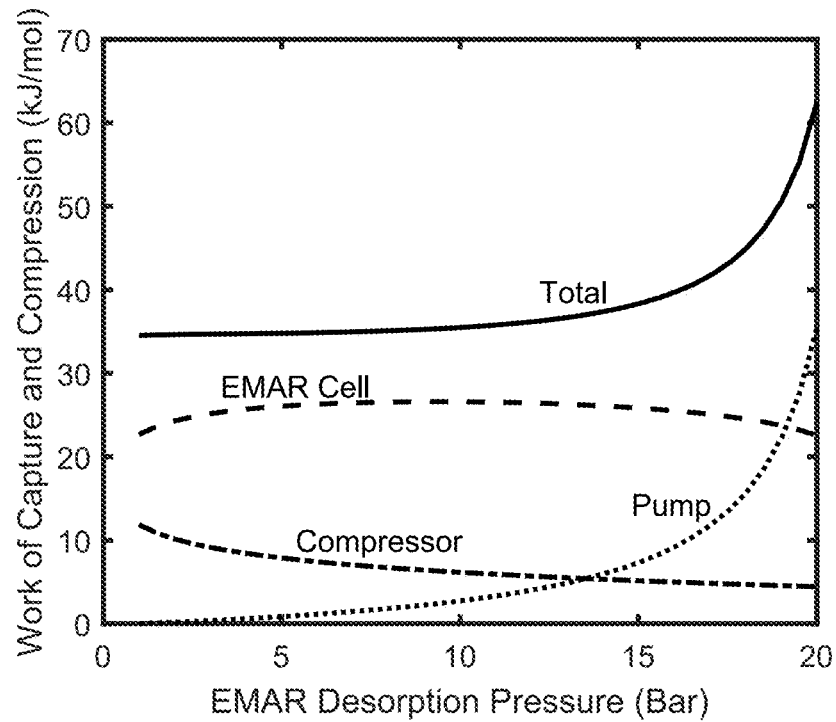
FIG. 6B shows the work of capture and compression versus desorption pressure for electrochemically mediated amine recovery, according to some embodiments.

Electrochemically mediated amine recovery desorption pressure unlike copper loading shift has a significant effect on total work of capture as shown in FIG. 6B. An increase in electrochemically mediated amine recovery desorption pressure results in an increase in total work of capture, dominated at high desorption pressures by the work of pumping. Not only does a higher desorption pressure require a higher outlet pump pressure, but the additional dissolved $CO_2$ in the anode (e.g. $CO_2$ not released by the desorption) requires additional volumetric flow to pass through the pump. These two effects compound each other. Naturally, increasing desorption pressure decreases compression work, not enough however to compensate for the increased pump work. Only a minimal thermodynamic penalty is applied on desorption pressures up to 10 bar for the 60% copper loading shift tested.

Figure 7:
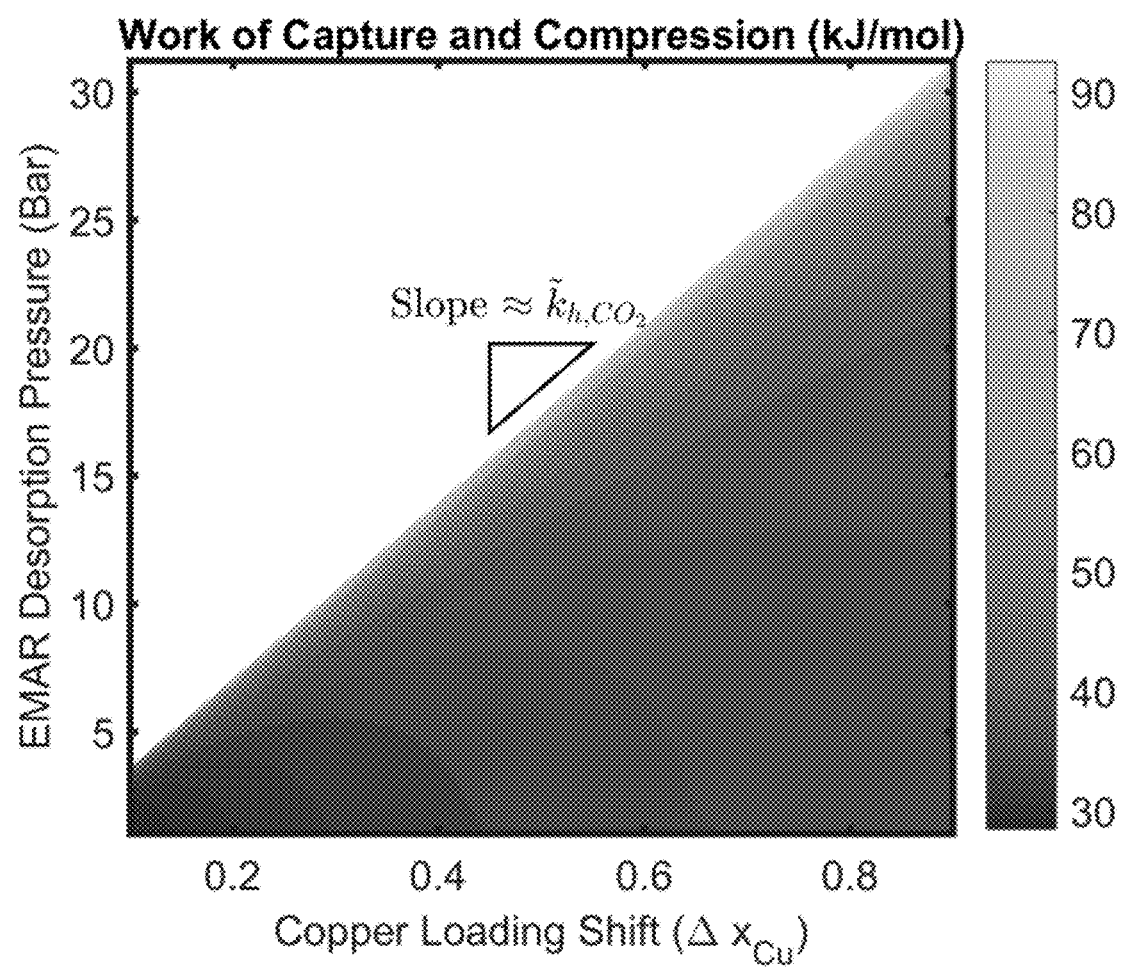
FIG. 7 shows the total work of capture and compression as a function of copper loading shift and desorption pressure, according to some embodiments.

An analysis similar to that seen in FIG. 6A and FIG. 6B may be employed for all desorption pressures and copper loading shifts within the electrochemically mediated amine recovery operating window defined by equation 3. The result is the heat map given in FIG. 7. As generally expected, lower copper loading shifts and lower electrochemically mediated amine recovery desorption pressures are preferred from an operational cost standpoint. It is expect that capital display the opposite behavior from the operational costs, requiring a smaller absorber as copper loading shifts increase and a smaller compressor as desorption pressures increase.

Figure 8:
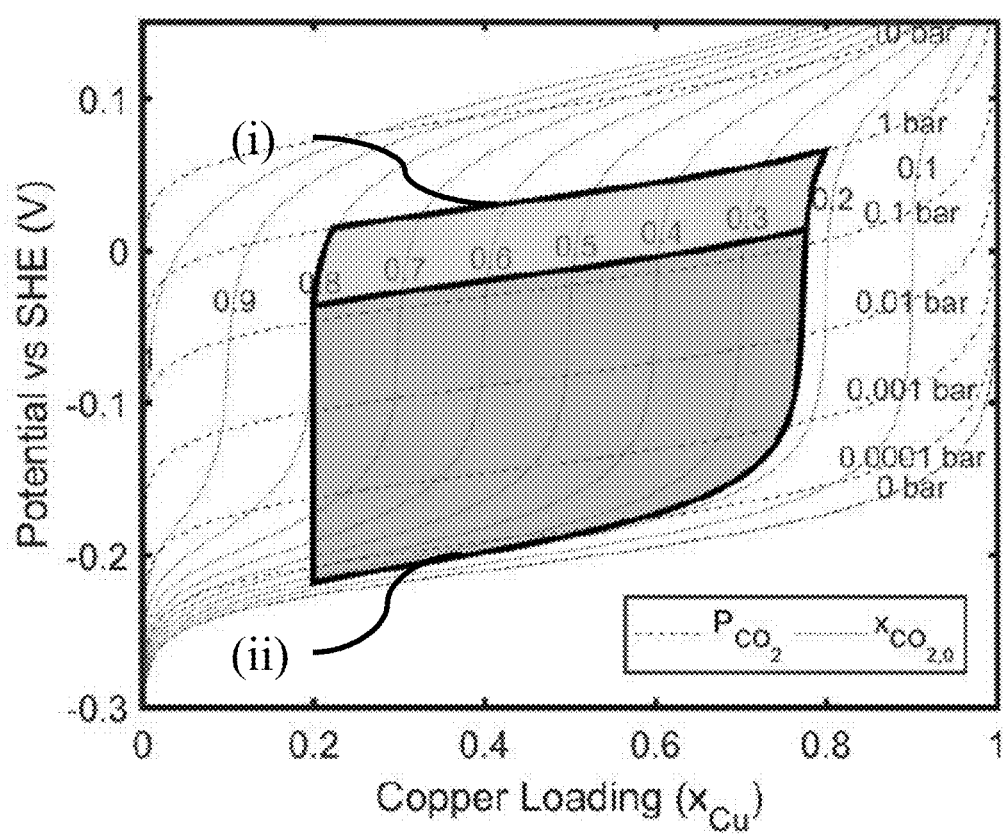
FIG. 8 shows the total work of removal of $CO_2$ by the system compared to the total work of removal of $CO_2$ in a system with a separate absorber and cathode, according to some embodiments.
Figure 9:
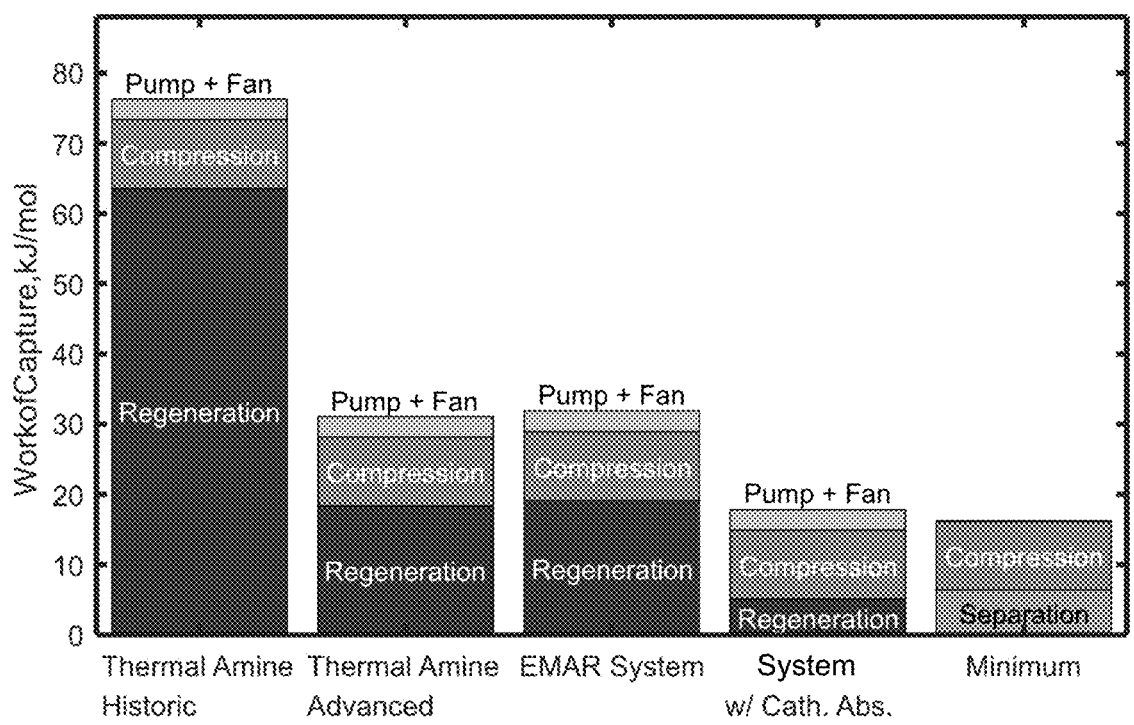
FIG. 9 shows the work of capture of $CO_2$ of a system with the cathodic absorber as compared to other conventional systems and the estimated minimum work of capture, according to some embodiments.

Transitioning the electrochemically mediated amine recovery cycle from a three-stage system to a two-stage system, through the addition of a cathodic absorber, significantly improves the minimum work of capture. This is accomplished by introducing a plurality of hollow fibers or some other monolithic membrane absorption structure into the cathodic channel. The cathodic path is modified, changing from a constant effective $CO_2$ loading, $x_{CO_{2,0}}$, path to a constant $CO_2$ partial pressure path. Further, the constant state of charge absorption path would be removed. The result shown in FIG. 8, is a shift of the cathodic path towards a much less negative OCV, bringing the cathodic OCV closer to that of the anodic path, as the total work of removal of $CO_2$ by the system (i) is compared to the total work of removal of $CO_2$ in a system with a separate absorber and cathode (ii). The decrease in the electrochemical work of capture significantly increases the efficiency of the electrochemically mediated amine recovery cycle, as shown in FIG. 9. The incorporation of a cathodic absorption also serves to decrease capital cost through process intensification.

As previously stated, modification of thermal amine scrubbing is the incumbent carbon dioxide capture technology. Traditionally, thermal amine processes require 70-80 kJ/mol $CO_2$ to capture from a 15% $CO_2$ stream and compress to 150 bar. The incorporation of cathodic absorption into the electrochemically mediated amine recovery process dramatically decreases the thermodynamic work of capture to near that of the thermodynamic minimum.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. A system for at least partially removing $CO_2$ from a feed gas comprising $CO_2$, comprising:
   an anode at least partially contained within an anodic chamber;
   a cathode at least partially contained within a cathodic chamber, wherein the anodic chamber and the cathodic chamber are in fluid connection with each other, and wherein the cathode comprises at least one cathodic channel capable of allowing the flow of $CO_2$ through the at least one channel;
   a solution comprising a complexation agent, metal ions, and a supporting electrolyte, wherein the complexation agent is capable of associating and/or disassociating with $CO_2$ and/or the metal ions, and the complexation agent is configured to disassociate $CO_2$ in the anodic chamber via the application of an electrical potential;
   a membrane separator at least partially disposed between the anodic chamber and the cathodic chamber; and
   at least one gas input associated with the cathode and/or the cathodic chamber;
   at least one gas outlet for removing uncaptured gas from the system; and
   at least one gas outlet associated with the anodic chamber for removing $CO_2$ from the anodic chamber,
   wherein the system is free of a thermal amine scrubbing system for removing $CO_2$.

2. The system of claim 1, wherein the feed gas comprising $CO_2$ is provided through the at least one cathodic channel.

3. The system of claim 1, wherein the at least one cathodic channel comprises a plurality of hollow fiber membranes.

4. The system of claim 3, wherein the plurality of hollow fiber membranes are permeable.

5. The system of claim 3, wherein the plurality of hollow fiber membranes are selected from the group consisting of cellulose acetate, polysulfone, and polyvinylidene fluoride.

6. The system of claim 1, wherein the cathode is a cathodic absorber.

7. The system of claim 3, wherein the anode is an anodic desorber.

8. The system of claim 1, wherein $CO_2$ has a partial pressure of between 0.02 bar and 0.15 bar at the cathode.

9. The system of claim 1, wherein $CO_2$ has a partial pressure of between 1 bar and 20 bar at the anode.

10. The system of claim 1, wherein the complexation agent is an amine.

11. The system of claim 10, wherein the amine is ethylenediamine.

12. The system of claim 1, wherein the metal ions are generated from oxidation of the anode.

13. The system of claim 1, wherein the metal ions comprise copper.

14. The system of claim 1, wherein the membrane separator is permeable.

15. The system of claim 1, wherein the membrane separator allows for fluid communication between the cathodic chamber and the anodic chamber.

16. The system of claim 1, wherein an electrical potential is applied to the system.

* * * * *